United States Patent
Ketchum et al.

(10) Patent No.: US 7,197,084 B2
(45) Date of Patent: Mar. 27, 2007

(54) PRECODING FOR A MULTIPATH CHANNEL IN A MIMO SYSTEM

(75) Inventors: John W. Ketchum, Harvard, MA (US); Bjorn A. Bjerke, Boston, MA (US)

(73) Assignee: Qualcomm Incorporated, San Diego, CA (US)

( * ) Notice: Subject to any disclaimer, the term of this patent is extended or adjusted under 35 U.S.C. 154(b) by 746 days.

(21) Appl. No.: 10/108,616

(22) Filed: Mar. 27, 2002

(65) Prior Publication Data

US 2003/0185310 A1    Oct. 2, 2003

(51) Int. Cl.
 *H04K 1/02* (2006.01)
 *H04L 25/03* (2006.01)
 *H04L 25/49* (2006.01)

(52) U.S. Cl. ..................... 375/296; 375/295
(58) Field of Classification Search ............... 375/259, 375/296, 316
 See application file for complete search history.

(56) References Cited

U.S. PATENT DOCUMENTS

| | | | |
|---|---|---|---|
| 6,193,399 B1* | 2/2001 | Hulse | 362/511 |
| 6,327,664 B1 | 12/2001 | Dell et al. | |
| 6,473,467 B1* | 10/2002 | Wallace et al. | 375/267 |
| 6,870,882 B1* | 3/2005 | Al-Dhahir et al. | 375/233 |
| 2002/0067309 A1* | 6/2002 | Baker et al. | 342/367 |
| 2002/0163879 A1* | 11/2002 | Li et al. | 370/200 |
| 2002/0193146 A1* | 12/2002 | Wallace et al. | 455/562 |
| 2002/0196842 A1* | 12/2002 | Onggosanusi et al. | 375/148 |
| 2003/0043929 A1* | 3/2003 | Sampath | 375/267 |
| 2003/0112901 A1* | 6/2003 | Gupta | 375/340 |

FOREIGN PATENT DOCUMENTS

| | | |
|---|---|---|
| EP | 1117197 A | 7/2001 |
| WO | WO 9809381 | 3/1998 |
| WO | WO 0161952 A | 8/2001 |

OTHER PUBLICATIONS

David Forney Jr. et al, "Combined equalization and coding using precoding", IEEE communications Magazine, Dec. 1991.*

(Continued)

*Primary Examiner*—Chieh M. Fan
*Assistant Examiner*—Jia Lu
(74) *Attorney, Agent, or Firm*—Thomas R. Rouse; Sandip (Micky) S. Minhas; Dmitry R. Milikovsky

(57) ABSTRACT

Techniques for precoding data for a multipath channel in a MIMO system. In one method, data is coded in accordance with one or more coding schemes to provide coded data, which is further modulated (i.e., symbol mapped) in accordance with one or more modulation schemes to provide modulation symbols. An estimated response of the MIMO channel is obtained (e.g., provided by a receiver), and an equivalent channel response is derived based on the estimated MIMO channel response and a response of a feed-forward filter of a decision feedback equalizer. The modulation symbols are then precoded based on the equivalent channel response to provide precoded symbols, which are further preconditioned based on the estimated MIMO channel response (e.g., using spatio-temporal pulse-shaping) to provide preconditioned symbols for transmission over the MIMO channel. The feed-forward filter may be adapted based on a minimum mean square error (MMSE) criterion.

20 Claims, 6 Drawing Sheets

OTHER PUBLICATIONS

Ariyavisitakul et al. "Optimum Space-Time Processors with Dispersive Interference: Unified Analysis and Required Filter Span", *IEEE Transactions on Communications*, 47(7) pp. 1073-1082, (1999).

Fischer, R. F. H. et al., "Tomlinson-Harashima Precoding in Space-Time Transmission for Low-Rate Backward Channel," International Zurich Seminar on Broadband Communications, Feb. 19-21, 2002, pp. 7-1-7-6.

Sampath, H. et al., "Achievable Rate Region for Spatial Multiplexing Systems Using the MMSE Criterion," ISIT 2000, Jun. 25, 2000, pp. 496-496.

Sampath, H., "Linear Precoding and Decoding for Multiple Input Multiple Output (MIMO) Wireless Channels." PHD Thesis Stanford University, Apr. 2001, section 2.1.2: The Matrix Channel.

Sampath, H. et al., "Pre-Equalization for MIMO Wireless Channels With Delay Spread," VTC 2000, vol. 3, Sep. 24, 2000, pp. 1175-1178.

* cited by examiner

PRECODING FOR A MULTIPATH CHANNEL IN A MIMO SYSTEM

BACKGROUND

1. Field

The present invention relates generally to data communication, and more specifically to techniques for precoding data for a multipath channel in a multiple-input multiple-output (MIMO) communication system.

2. Background

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized.

To increase the overall spectral efficiency of the MIMO system, a data stream may be transmitted on each of the $N_S$ spatial subchannels. Each data stream may be processed (e.g., encoded, interleaved, and modulated) to provide a corresponding symbol stream, which is then transmitted over a respective spatial subchannel. Due to scattering in the propagation environment, the $N_S$ transmitted symbol streams interfere with each other at the receiver. Each received signal may then include a component of each of the $N_S$ transmitted symbol streams.

At the receiver, various equalization techniques may be used to process the $N_R$ received signals to recover the $N_S$ transmitted symbol streams. These equalization techniques include linear equalization and non-linear equalization techniques. Linear equalization tends to enhance the noise in the received signals, and the noise enhancement may be severe for a multipath channel with frequency selective fading, which is characterized by different channel gains across the system bandwidth. modulation symbols are then precoded based on the equivalent channel response to provide precoded symbols, which are further preconditioned based on the estimated MIMO channel response (e.g., using spatio-temporal pulse-shaping) to provide preconditioned symbols for transmission over the MIMO channel In another embodiment, a method is provided for processing a data transmission received via a multipath MIMO channel. In accordance with the method, which is performed at a receiver, a number of received signals are initially preconditioned based on an estimated response of the MIMO channel (e.g., using spatio-temporal pulse-shaping) to provide received symbols. The received symbols are then filtered (or equalized) with a feed-forward filter to provide equalized symbols, which are estimates of the modulation symbols that have been precoded at a transmitter prior to transmission over the MIMO channel. A vector modulo-2M operation may be performed on the equalized symbols to provide recovered symbols. The equalized or recovered symbols are then demodulated and decoded to recover the transmitted data. The preconditioning orthogonalizes the received symbol streams, in which case the filtering may be performed separately for each received symbol stream. Channel state information (CSI), which may comprise a sequence of matrices for the estimated MIMO channel response and signal-to-noise-and-interference ratios (SNRs) for a number of transmission channels of the MIMO channel, may be derived and sent back to the transmitter.

For both embodiments, the feed-forward filter may be adapted based on a minimum mean square error (MMSE) criterion or some other criterion.

Various aspects and embodiments of the invention are described in further detail below. The invention further provides methods, digital signal processors, transmitter and receiver units, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
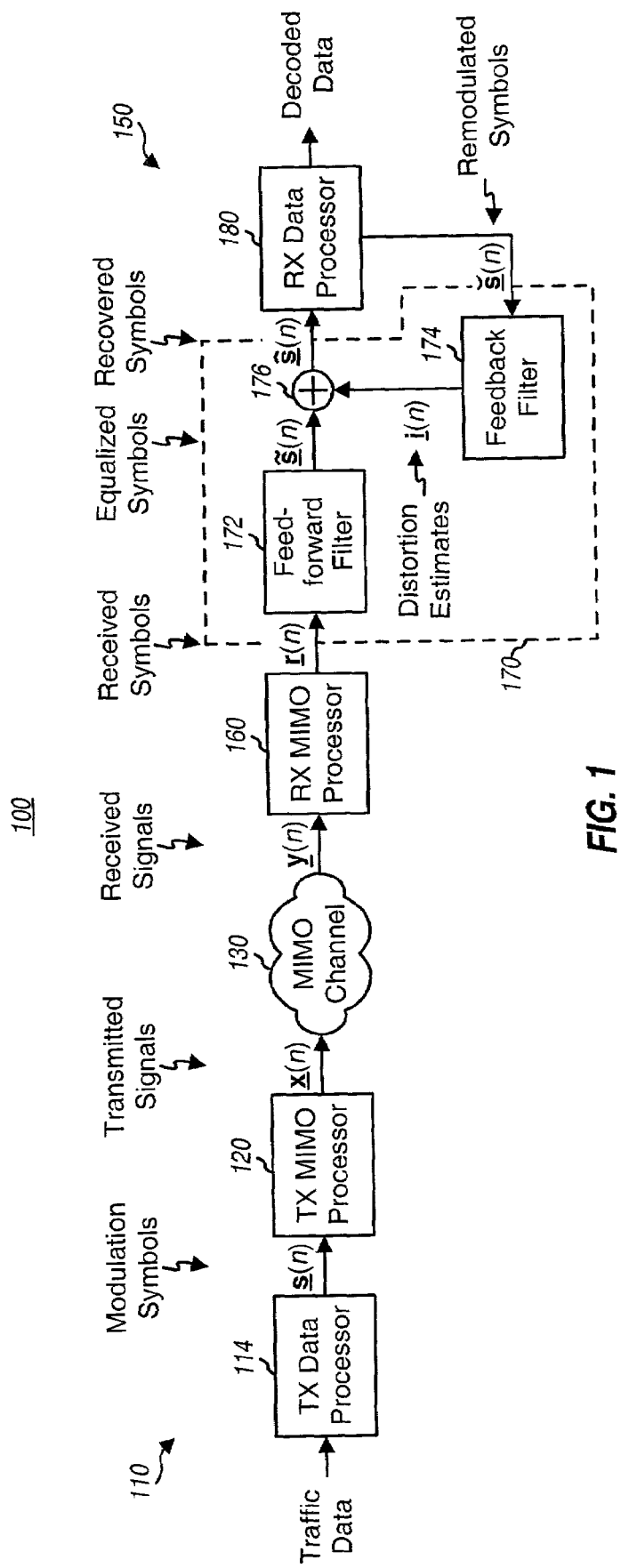
FIG. 1 is a block diagram of a MIMO system that performs MIMO processing to orthogonalize the symbol streams and further utilizes a decision feedback equalizer (DFE) at the receiver.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel (or a transmission channel) of the MIMO channel. The number of spatial subchannels is determined by the number of eigenmodes for the MIMO channel, which in turn is dependent on a channel response matrix, H, that describes the response between the $N_T$ transmit and $N_R$ receive antennas.

To increase the overall spectral efficiency of the MIMO system, a data stream may be transmitted on each of the $N_S$ spatial subchannels. Each data stream may be processed to provide a corresponding symbol stream. Due to scattering in the propagation environment, the $N_S$ transmitted symbol streams interfere with each other at the receiver. Each of the $N_R$ received signals may then include a component of each of the $N_S$ transmitted symbol streams.

Channel eigenmode decomposition is one technique for facilitating the transmission of multiple symbol streams over the MIMO channel. This technique initially decomposes the channel response matrix, H, using singular value decomposition (SVD). For a multipath channel with frequency selective fading, the decomposition may be performed for each of a number of frequencies (or frequency bins), as follows:

$$H(k) = U(k)\lambda(k)V^H(k), \quad \text{Eq (1)}$$

where H(k) is the channel response matrix for frequency $f_k$ (or frequency bin k), U(k) is an $N_R \times N_R$ unitary matrix (i.e., $U^H U = I$, where I is the identity matrix with ones along the diagonal and zeros everywhere else);

$\lambda(k)$ is an $N_R \times N_T$ diagonal matrix of singular values of H(k); and V(k) is an $N_T \times N_T$ unitary matrix.

The diagonal matrix $\lambda(k)$ contains non-negative real values along the diagonal (i.e., $\lambda(k) = \text{diag} \{\lambda_1(k), \lambda_2(k), \ldots, \lambda_{N_T}(k)\}$) and zeros elsewhere. The $\lambda_i(k)$ are referred to as the singular values of the matrix H(k).

Singular value decomposition is a matrix operation known in the art and described in various references. One such reference is a book by Gilbert Strang entitled "Linear Algebra and Its Applications," Second Edition, Academic Press, 1980, which is incorporated herein by reference.

Singular value decomposition may thus be used to decompose the MIMO channel into its eigenmodes, with each eigenmode corresponding to a spatial subchannel. For a multipath channel, the singular value decomposition may be performed as shown in equation (1) for each frequency bin k, where $0 \leq k \leq (N_F - 1)$. The rank r(k) of H(k) corresponds to the number of eigenmodes for the MIMO channel for frequency bin k. The $\lambda_i(k)$, for $0 \leq i \leq (r(k)-1)$ and $0 \leq k \leq (N_F - 1)$, are indicative of the channel responses for the spatial subchannels corresponding to the eigenmodes of H(k).

The singular values $\lambda_i(k)$ are also the positive square roots of the eigenvalues of a correlation matrix, R(k), where $R(k) = H^H(k)H(k)$. The eigenvectors of the correlation matrix R(k) are thus the same as the columns of V(k), and the columns of U(k) may be computed from the singular values and the columns of V(k).

The matrices U(k) and V(k), for $0 \leq k \leq (N_F - 1)$, may be used to orthogonalize the multiple symbol streams transmitted over the MIMO channel. The columns of V(k) are steering vectors for frequency bin k and may be used at the transmitter to precondition symbols prior to transmission over the MIO channel. Correspondingly, the columns of U(k) are also steering vectors for frequency bin k and may be used at the receiver to precondition the symbols received from the MIMO channel. The preconditioning at the transmitter and receiver may be performed in either the frequency domain or the time domain, as described below. The preconditioning (or MIMO processing) with the matrices V(k) and U(k) at the transmitter and receiver, respectively, results in the overall orthogonalization of the multiple symbol streams at the receiver.

FIG. 1 is a block diagram of a MIMO system 100 that performs MIMO processing to orthogonalize the symbol streams and further utilizes a decision feedback equalizer (DFE) at the receiver. For simplicity, the channel response matrix, H(k), is assumed to be full rank (i.e., $r(k) = N_S = N_T \leq N_R$), and one data stream is assumed to be transmitted over all frequency bins of each of the $N_T$ spatial subchannels.

At a transmitter 110, the traffic data to be transmitted (i.e., the information bits) is provided to a transmit (TX) data processor 114, which encodes, interleaves, and modulates the traffic data for each of $N_T$ data streams to provide a corresponding stream of modulation symbols. A transmit (TX) MIMO processor 120 then receives the $N_T$ modulation symbol streams (denoted as a modulation symbol vector, s(n)) and performs MIMO processing (i.e., preconditioning) on the modulation symbol streams to provide $N_T$ transmitted signals (denoted as a transmitted signal vector, x(n)). The $N_T$ transmitted signals are then conditioned (e.g., filtered, amplified, and upconverted) and transmitted from $N_T$ transmit antennas over a MIMO channel 130 to a receiver 150.

At receiver 150, the $N_T$ transmitted signals are received by $N_R$ receive antennas. A receive (RX) MIMO processor 160 then performs the complementary MIMO processing on the $N_R$ received signals (denoted as a received signal vector, y(n)) to provide $N_R$ received symbol streams (denoted as a received symbol vector, r(n)).

A decision feedback equalizer 170, which includes a feed-forward filter 172 and a feedback filter 174, then processes the $N_R$ received symbol streams to provide $N_T$ recovered symbol streams (denoted as a recovered symbol vector, ŝ(n)), which are estimates of the modulation symbol streams, s(n), at transmitter 110. In particular, feed-forward filter 172 filters the $N_R$ received symbol streams, r(n), with a response of $M_f(l)$ to provide $N_T$ equalized symbol streams (denoted as an equalized symbol vector, s̃(n)). A summer 176 then combines the equalized symbols with distortion estimates (denoted as an interference vector, i(n)) from feedback filter 174 to provide the recovered symbols, ŝ(n). An RX data processor 180 then demodulates the recovered symbols to provide demodulated data, and further deinterleaves and decodes the demodulated data to provide decoded data, which is an estimate of the transmitted traffic data.

In one implementation of decision feedback equalizer 170, the demodulated data is re-modulated (i.e., symbol mapped) by RX data processor 180 to provide re-modulated symbols, which are representative of the modulation symbols for the demodulated data. In another implementation, the decoded data is re-encoded, interleaved, and re-modulated by RX data processor 180 to provide the remodulated symbols. In any case, the remodulated symbols (denoted as a remodulated symbol vector, š(n)) are fed back to feedback filter 174 and filtered with a response of $M_b(l)$ to provide estimates of the distortion caused by the detected symbols (i.e., symbols that have been demodulated) on the not yet detected symbols. The details of the signal processing shown in FIG. 1 are described in further detail below.

As is well known in the art, frequency selective fading on a multipath channel causes inter-symbol interference (ISI), which is a phenomenon whereby each symbol in a received signal causes distortion to subsequent symbols in the received signal. This distortion degrades performance by impacting the ability to correctly detect the symbols.

Linear equalization may be used to correct for the frequency selective fading of a multipath channel. However, linear equalization may also result in severe noise enhancement, which may then yield unsatisfactory performance for a MIMO system.

Decision feedback equalization may be advantageously used for a MIMO channel with severe multipath. With decision feedback equalization, the detected symbols are used to generate remodulated symbols, which are further used to derive an estimate of the distortion caused by the already detected symbols. If the symbols can be detected without errors (or with minimal errors) and if the response of the MIMO channel can be accurately estimated, then the distortion can be accurately estimated and the inter-symbol interference caused by the already detected symbols may be effectively canceled out. However, the performance of the decision feedback equalizer is impaired if symbols detected in error are fed back. For a MIMO channel with severe multipath, the effect of error propagation may be so detrimental that the performance of the decision feedback equalizer may be worse than that of a linear equalizer.

Techniques are provided herein to precode data to avoid the deleterious effects of error propagation in a decision feedback equalizer in a MIMO system. At the transmitter, traffic data may be coded, interleaved, and modulated in the normal manner. The modulation symbols are then precoded prior to the MIMO processing and transmission over the MIMO channel. The precoding derives an estimate of the distortion due to inter-symbol interference at the receiver and subtracts this estimated distortion to the symbols to be transmitted. In this way, the MIMO system is able to achieve performance comparable to that provided by the decision feedback equalizer, but without the need to feed back detected symbols. The precoding can be performed at the transmitter since (1) the symbols to be transmitted are known and can therefore be fed back error-free, and (2) channel state information used to perform the MIMO processing is available and may also be used to derive the distortion estimate.

In FIG. 1, an equivalent channel for the received symbol vector, r(n), may be defined to include the responses of (1) the MIMO processing by TX MIMO processor 120, (2) the MIMO channel 130, and (3) the MIMO processing by RX MIMO processor 160. This equivalent channel has an impulse response (i.e., a unit sample response) of $\Lambda(l)$. Using this equivalent channel, the received symbol vector, r(n), may be characterized as a convolution in the time domain, as follows:

$$r(n) = \sum_i \Lambda(i)s(n-i) + z(n), \quad \text{Eq (2)}$$

where z(n) is the received noise, as transformed by the MIMO processing at the receiver.

The equivalent channel for the received symbol vector, r(n), has a frequency response of $\lambda(f)$. A matched filter receiver for r(n) would include a filter matched to the impulse response of $\Lambda(l)$. Such a matched filter would have an impulse response of $\Lambda^H(-l)$ and a corresponding frequency response of $\lambda^t(f)$, where the superscript "t" denotes a matrix transpose. The end-to-end frequency response of the equivalent channel for r(n) and its matched filter may be given as $\psi(f)=\lambda(f)\lambda^t(f)$.

The end-to-end frequency response of $\psi(f)$ may be spectrally factorized into a hypothetical filter and its matched filter. This hypothetical filter may be defined to have a causal impulse response of $\Gamma(l)$, where $\Gamma(l)=0$ for $l<0$, and a corresponding frequency response of $\gamma(f)$. The end-to-end frequency response of the hypothetical filter and its matched filter is (by definition) equal to the end-to-end frequency response of the equivalent channel for r(n) and its matched filter, i.e., $\gamma(f)\gamma^H(f)=\psi(f)$.

Using the spectral factorization described above, an equivalent channel for the equalized symbol vector, $\tilde{s}(n)$, may be defined to include the responses of (1) the MIMO processing by TX MIMO processor 120, (2) the MIMO channel 130, (3) the MIMO processing by RX MIMO processor 160, and (4) the feed-forward filter 172. This equivalent channel has an impulse response that may be expressed as:

$$F_0 F(l) = \sum_{i=0}^{L} M_{frx}(l-i)\Gamma(i), \quad \text{Eq (3)}$$

where F(l) is an $N_T \times N_T$ matrix that describes the impulse response of the equivalent channel for $\tilde{s}(n)$, with each element of F(l) comprising a sequence of $L+K_1+1$ values;

$M_{frx}(i)$ is an $N_T \times N_R$ matrix that describes the feed-forward filter impulse response, with each element of $M_{frx}(i)$ comprising a sequence of $K_1+1$ values; and $\Gamma(i)$ is an $N_R \times N_T$ matrix that describes the hypothetical filter impulse response, with each element of $\Gamma(i)$ comprising a sequence of $L+1$ values.

In equation (3), $F_0$ is chosen so that $F(0)=I$, and may be expressed as:

$$F_0 = \sum_{i=0}^{L} M_{frx}(-i)\Gamma(i). \quad \text{Eq (4)}$$

If spatio-temporal pulse-shaping (described below) is used to achieve spatial orthogonalization of the symbol streams, then $\Gamma(i)$ and $M_{frx}(i)$ are diagonal matrices. In this case, the equivalent channel impulse response matrix, F(l), is also diagonal.

If the hypothetical filter impulse response, $\Gamma(i)$, is time limited to $0 \leq i \leq L$ and the feed-forward filter impulse response, $M_{frx}(i)$, is time limited to $-K_1 \leq i \leq 0$, then the equivalent channel response, F(l), is non-causal with a time extent of $-K_1 \leq l \leq L$. In a practical system, this non-causal response may be accounted for (or converted into a realizable causal response) by providing an additional delay of $K_1$ symbol periods at the receiver.

Figure 2:
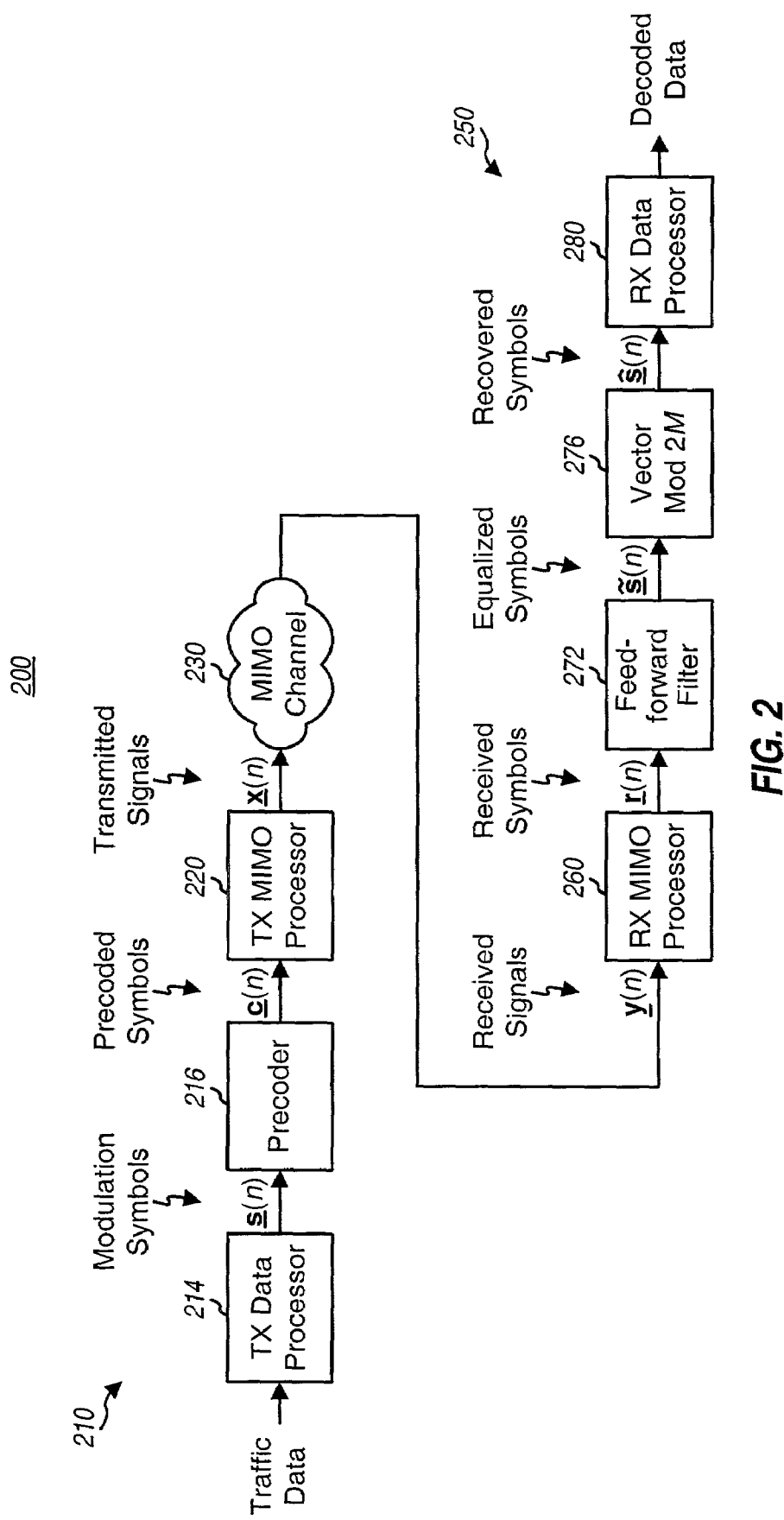
FIG. 2 is a block diagram of a MIMO system that performs preceding for a multipath channel and MIMO processing to orthogonalize the symbol streams.

FIG. 2 is a block diagram of a MIMO system 200 that performs precoding for a multipath channel and MIMO processing to orthogonalize the symbol streams. At a transmitter 210, the traffic data to be transmitted is provided to a TX data processor 214, which encodes, interleaves, and modulates the traffic data for each of $N_T$ data streams to provide a corresponding stream of modulation symbols. A separate coding and modulation scheme may be selected for each data stream. In an embodiment, each modulation scheme corresponds to a square (or 2-dimensional) quadrature amplitude modulation (QAM) signal constellation, which may be viewed as a Cartesian product of two orthogonal (1-dimensional) pulse amplitude modulation (PAM) signal constellations. Each PAM signal constellation includes a set of M points, uniformly distributed along a line, with values of $\{-(M-1), -(M-3), \ldots, (M-3), (M-1)\}$. TX data processor 214 provides $N_T$ modulation symbol streams, s(n).

A precoder 216 then receives and precodes the $N_T$ modulation symbol streams, s(n), to provide $N_T$ precoded symbol streams, c(n). The precoding may be performed as follows:

$$\underline{c}(n) = vmod_{2M}\left[\underline{s}(n) - \sum_{\substack{l=-K_1 \\ l \neq 0}}^{L} \underline{F}(l)\underline{c}(n-l)\right] \quad \text{Eq (5)}$$

$$= \underline{s}(n) + 2M[\underline{\mu}(n) + j\underline{v}(n)] - \sum_{\substack{l=-K_1 \\ l \neq 0}}^{L} \underline{F}(l)\underline{c}(n-l),$$

where "$vmod_{2M}[\cdot]$" is a vector modulo-2M arithmetic operation (i.e., a modulo-2M operation on each element of the vector [•]).

In equation (5), the term $$\sum \underline{F}(l)\underline{c}(n-l)$$

represents an estimate of the distortion that would have been derived by the feedback filter of a decision feedback equalizer at the receiver. With precoding, this distortion is estimated at the transmitter based on prior precoded symbols, c(n-l), and the impulse response F(l) of the equivalent channel for the equalized symbols, š(n). The distortion is then subtracted from the modulation symbols, s(n), to derive the precoded symbols, c(n).

Each precoded symbol, $c_i(n)$, is generated as a combination of a modulation symbol, $s_i(n)$, and its estimated distortion. This combination can result in an expansion of the original (e.g., QAM) signal constellation for the modulation symbol, $s_i(n)$. The $vmod_{2M}[\cdot]$ operation is then performed to fold back the expanded signal constellation to preserve the original signal constellation. The $vmod_{2M}[\cdot]$ operation may be replaced with, and is equivalent to, an addition with the term $2M[\mu(n)+jv(n)]$. Each element of the vector $\mu(n)$ is an integer selected such that the real part of the corresponding element of c(n) satisfies the condition $-M_i \leq Re\{c_i(n)\} \leq M_i$, where $M_i$ is the i-th element of the vector M and is related to the signal constellation used for modulation symbol $s_i(n)$. Similarly, each element of the vector v(n) is an integer selected such that the imaginary part of the corresponding element of c(n) satisfies the condition $-M_i \leq Im\{c_i(n)\} \leq M_i$.

A TX MIMO processor 220 then receives and performs MIMO processing on the $N_T$ precoded symbol streams, c(n), to provide $N_T$ transmitted signals, x(n). The $N_T$ transmitted signals are then conditioned and transmitted from $N_T$ transmit antennas over a MIMO channel 230 to a receiver 250.

At receiver 250, the $N_T$ transmitted signals are received by $N_R$ receive antennas. A RX MIMO processor 260 then performs the complementary MIMO processing on the $N_R$ received signals, y(n), to provide $N_T$ received symbol streams, r(n).

A feed-forward filter 272 then filters the $N_T$ received symbol streams, r(n), to provide $N_T$ equalized symbol streams, š(n). Using the impulse response of $F_0F(l)$ for the equivalent channel for š(n), the equalized symbol streams may be expressed as:

$$\tilde{s}(n) = F_0 \sum_{l=-K_1}^{L} \underline{F}(l)\underline{c}(n-l) + \tilde{z}(n), \quad \text{Eq (6)}$$

where $\tilde{z}(n)$ is the received noise, transformed by the MIMO processing and feed-forward filter at the receiver.

The precoding in equation (5) may be rewritten as follows:

$$\underline{s}(n) + 2M[\underline{\mu}(n) + j\underline{v}(n)] = \sum_{l=-K_1}^{L} \underline{F}(l)\underline{c}(n-l). \quad \text{Eq (7)}$$

Combining equations (6) and (7), the equalized symbol streams, š(n), may be expressed as:

$$\tilde{s}(n) = F_0\lfloor\underline{s}(n) + 2M[\underline{\mu}(n) + j\underline{v}(n)]\rfloor + \tilde{z}(n). \quad \text{Eq (8)}$$

As shown in equation (8), the precoding at the transmitter results in an expansion of the original (e.g., QAM) signal constellation at the receiver. In particular, if $s_i(n)$ is a valid signal point in the original signal constellation, then $s_i(n)+2M_i(\mu_i(n)+jv_i(n))$ is also a valid signal point in the expanded signal constellation, where $\mu_i(n)$ and $v_i(n)$ are integers selected such that the corresponding precoded symbol $c_i(n)$ conforms within the original signal constellation at the transmitter, as described above. A unit 276 then prescales the equalized symbol streams, š(n), with $F_0^{-1}$ to compensate for the factor $F_0$ in equation (8), and further performs vector modulo-2M operation on the resultant symbol streams, as follows:

$$\hat{s}(n) = vmod_{2M}[F_0^{-1}\tilde{s}(n)]. \quad \text{Eq (9)}$$

The recovered symbol streams, ŝ(n), from equation (9) are estimates of the modulation symbol streams, s(n), at the transmitter. The vector modulo-2M operation at the receiver effectively folds the expanded signal constellation back to the original signal constellation. A RX data processor 280 then demodulates, deinterleaves, and decodes the recovered symbols to provide the decoded data, which is an estimate of the transmitted traffic data.

Figure 3:
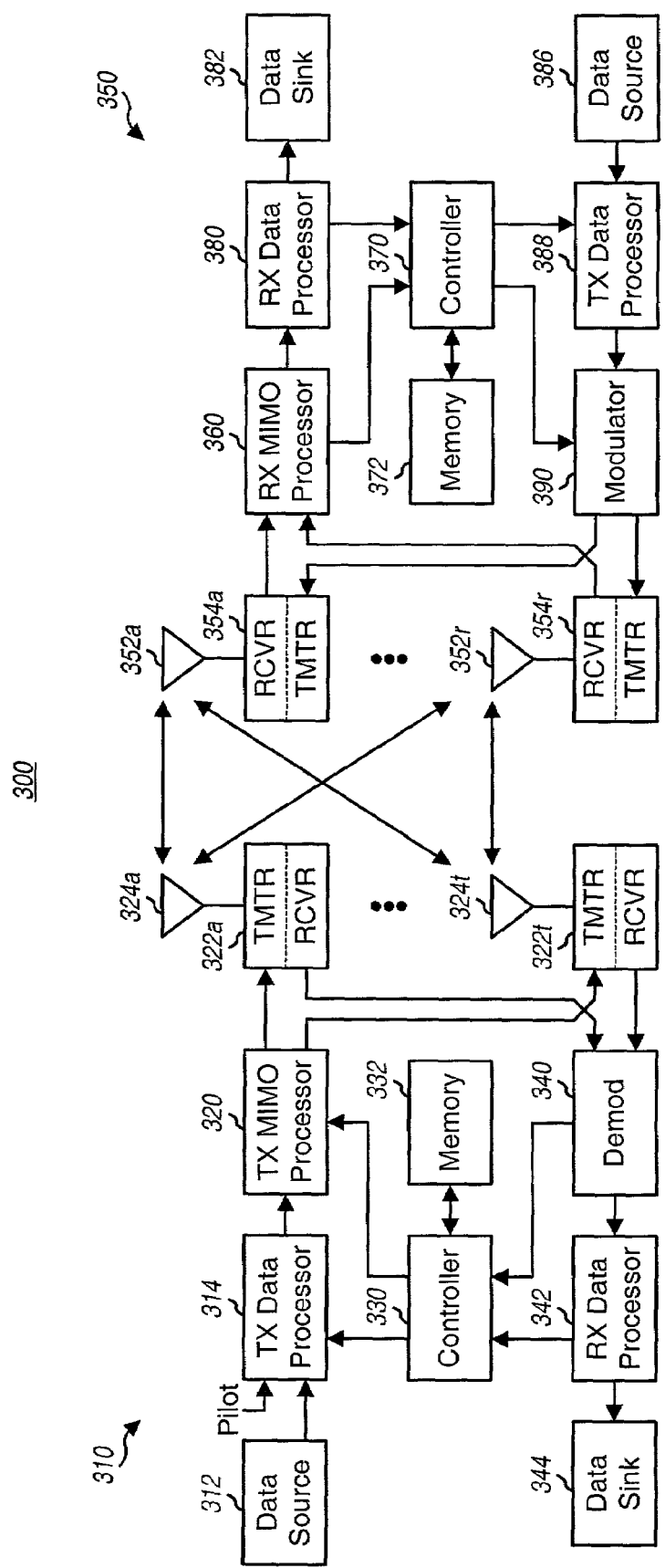
FIG. 3 is a block diagram of an embodiment of a transmitter system and a receiver system of a MIMO system.

FIG. 3 is a block diagram of an embodiment of a transmitter system 310 and a receiver system 350 of a MIMO system 300 capable of implementing various aspects and embodiments of the invention.

At transmitter system 310, traffic data is provided from a data source 312 to a TX data processor 314, which codes and interleaves the traffic data based on one or more coding schemes to provide coded data. The coded data may then be multiplexed with pilot data using, for example, time division multiplexing (TDM) or code division multiplexing (CDM). The pilot data is typically a known data pattern processed in a known manner, if at all, and may be used at the receiver system to estimate the response of the MIMO channel. The multiplexed pilot and coded data is then modulated (i.e., symbol mapped) based on one or more modulation schemes to provide modulation symbols. In an embodiment, one data stream is transmitted on each spatial subchannel, and each data stream may be coded and modulated based on a separate coding and modulation scheme to provide a corresponding modulation symbol stream. The data rate, coding, interleaving, and modulation for each data stream may be determined by controls provided by a controller 330. TX data processor 314 further precodes the modulation symbol streams to provide precoded symbol streams, as described above.

A TX MIMO processor 320 then receives and performs MIMO processing on the precoded symbol streams. The MIMO processing may be performed in the time domain or the frequency domain, as described in further detail below. TX MIMO processor 320 provides (up to) $N_T$ preconditioned symbol streams to transmitters (TMTR) 322a through 322t.

Each transmitter 322 converts a respective preconditioned symbol stream into one or more analog signals and further conditions (e.g., amplifies, filters, and upconverts) the analog signals to generate a modulated signal suitable for transmission over the MIMO channel. The (up to) $N_T$ modulated signals from transmitters 322a through 322t are then transmitted via antennas 324a through 324t to the receiver system.

At receiver system 350, the transmitted modulated signals are received by $N_R$ antennas 352a through 352r, and the received signal from each antenna 352 is provided to a respective receiver (RCVR) 354. Each receiver 354 conditions (e.g., filters, amplifies, and downconverts) the received signal and digitizes the conditioned signal to provide a respective stream of samples. An RX MIMO processor 360 receives $N_R$ sample streams from $N_R$ receivers 354 and performs MIMO processing and equalization on these sample streams to provide $N_T$ recovered symbol streams. The processing by RX MIMO processor 360 is described in further detail below.

An RX data processor 380 then demodulates, deinterleaves, and decodes the recovered symbol streams to provide decoded data. The processing by RX MIMO processor 360 and RX data processor 380 is complementary to that performed by TX MIMO processor 320 and TX data processor 314, respectively, at transmitter system 310.

RX MIMO processor 360 may further estimate the response of the MIMO channel, the signal-to-noise-and-interference ratios (SNRs) of the spatial subchannels, and so on, and provide these estimates to a controller 370. RX data processor 380 may also provide the status of each received packet or frame, one or more other performance metrics indicative of the decoded results, and possibly other information. Controller 370 then provides channel state information (CSI), which may comprise all or some of the information received from RX MIMO processor 360 and RX data processor 380. The CSI is processed by a TX data processor 388, modulated by a modulator 390, conditioned by transmitters 354a through 354r, and transmitted back to transmitter system 310.

At transmitter system 310, the modulated signals from receiver system 350 are received by antennas 324, conditioned by receivers 322, demodulated by a demodulator 340, and processed by an RX data processor 342 to recover the CSI transmitted by the receiver system. The CSI is then provided to controller 330 and used to generate various controls for TX data processor 314 and TX MIMO processor 320.

Controllers 330 and 370 direct the operation at the transmitter and receiver systems, respectively. Memories 332 and 372 provide storage for program codes and data used by controllers 330 and 370, respectively.

The preceding for a multipath channel in a MIMO system may be implemented in various manners. A specific design is described below whereby the preceding is performed in conjunction with channel eigenmode decomposition and spatial-temporal pulse-shaping. The channel eigenmode decomposition is used to determine the eigenmodes of the MIMO channel and to derive first and second sets of steering vectors used to precondition symbols at the transmitter and receiver, respectively, so that orthogonal symbol streams are recovered. Spatial-temporal pulse-shaping is a technique for performing the preconditioning in the time-domain. Waterfilling analysis may be used to more optimally allocate the total available transmit power to the eigenmodes such that high performance is achieved for the MIMO system. The channel eigenmode decomposition and spatio-temporal pulse-shaping are described in further detail below.

Figure 4:
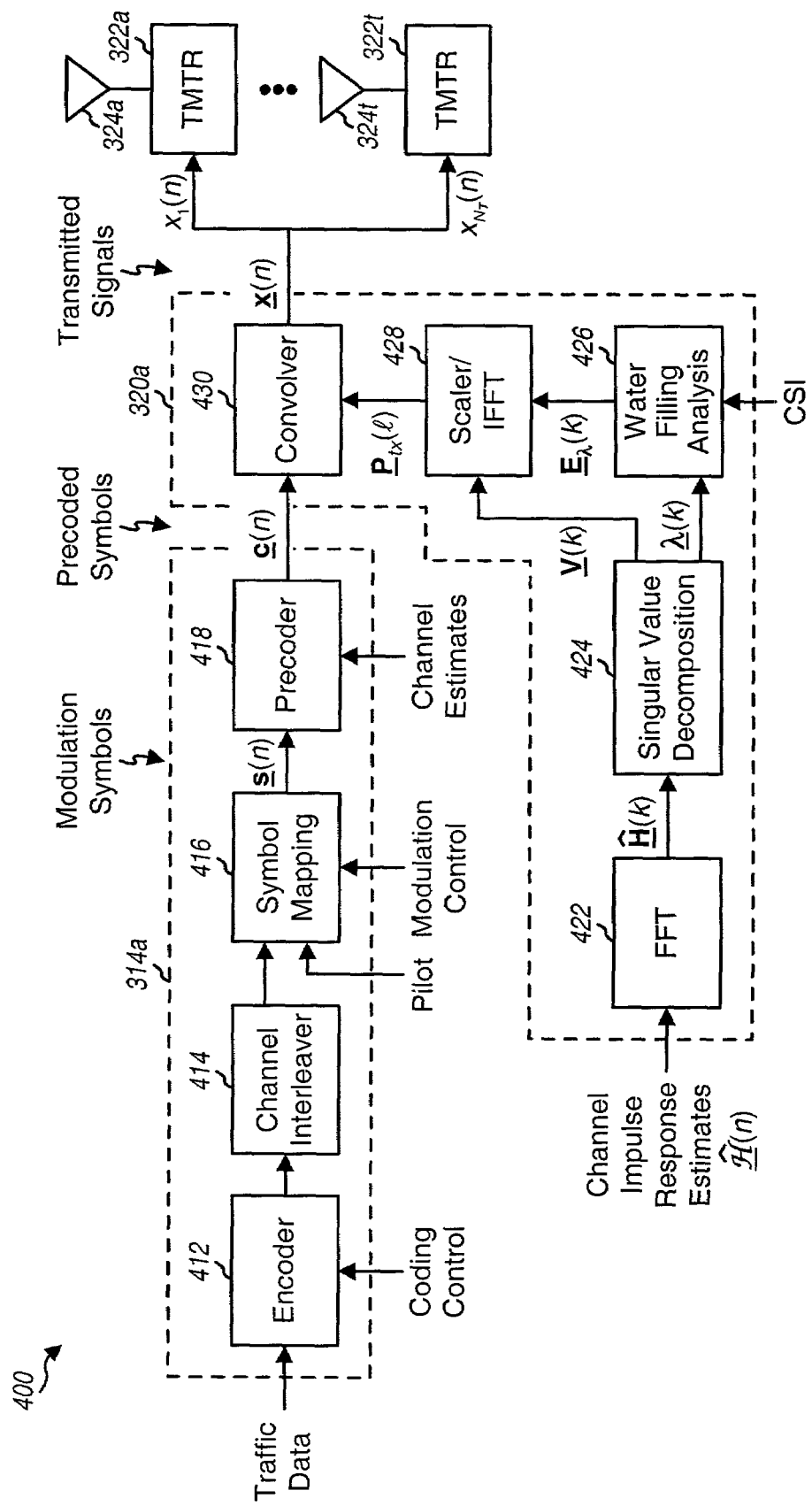
FIG. 4 is a block diagram of an embodiment of a transmitter unit that precodes data for a multipath channel and performs MIMO processing in the time domain.

FIG. 4 is a block diagram of an embodiment of a transmitter unit 400 that precodes data for a multipath channel and performs MIMO processing in the time domain. Transmitter unit 400 is a specific embodiment of the transmitter portion of transmitter system 310 in FIG. 3. Transmitter unit 400 includes (1) a TX data processor 314a that receives and processes traffic and pilot data to provide (up to) $N_T$ precoded symbol streams and (2) a TX MIMO processor 320a that preconditions the precoded symbol streams to provide (up to) $N_T$ preconditioned symbol streams. TX data processor 314a and TX MIMO processor 320a are one embodiment of TX data processor 314 and TX MIMO processor 320, respectively, in FIG. 3.

In the specific embodiment shown in FIG. 4, TX data processor 314a includes an encoder 412, a channel interleaver 414, a symbol mapping element 416, and a precoder 418. Encoder 412 receives and codes the traffic data (i.e., the information bits) in accordance with one or more coding schemes to provide coded bits. The coding increases the reliability of the data transmission. In an embodiment, a separate coding scheme may be used for each data stream, which may be transmitted via all frequency bins of a respective spatial subchannel. In alternative embodiments, a separate coding scheme may be used for each group of one or more data streams, or a common coding scheme may be used for all data streams. The specific coding scheme(s) to be used may be selected based on the CSI received from the receiver system and are identified by the coding controls from controller 330. Each selected coding scheme may include any combination of cyclic redundancy check (CRC), convolutional coding, Turbo coding, block coding, and other coding, or no coding at all.

Channel interleaver 414 interleaves the coded bits based on one or more interleaving schemes. For example, one interleaving scheme may be used with each coding scheme. The interleaving provides time diversity for the coded bits, permits data to be transmitted based on an average SNR for the spatial subchannel(s) used for data transmission, combats fading, and further removes correlation between coded bits used to form each modulation symbol.

Symbol mapping element 416 receives and multiplexes pilot data with the coded and interleaved data, and further symbol maps the multiplexed data in accordance with one or more modulation schemes to provide modulation symbols. A separate modulation scheme may be used for each data stream or each group of one or more data streams. Alternatively, a common modulation scheme may be used for all data streams. The symbol mapping for each data stream may be achieved by (1) grouping sets of multiplexed data bits to form non-binary symbols and (2) mapping each non-binary symbol to a point in a signal constellation corresponding to the modulation scheme (e.g., QPSK, M-PSK, M-QAM, or some other scheme) selected for use for that data stream. Each mapped signal point corresponds to a modulation symbol. Symbol mapping element 416 provides a vector of modulation symbols, s(n), for each symbol period n, with the number of modulation symbols in each vector being equal to the number of spatial subchannels to be used for that symbol period. Symbol mapping element 416 thus provides (up to) $N_T$ modulation symbol streams (i.e., a sequence of modulation symbol vectors, with each vector including up to $N_T$ modulation symbols).

To perform the precoding and MIMO processing at the transmitter, the response of the MIMO channel is estimated and used to precode the modulation symbols and to further precondition the precoded symbols prior to transmission over the MIMO channel. In a frequency division duplexed (FDD) system, the downlink and uplink are allocated different frequency bands, and the channel responses for the downlink and uplink may not be correlated to a sufficient degree. For the FDD system, the channel response may be estimated at the receiver and sent back to the transmitter. In a time division duplexed (TDD) system, the downlink and uplink share the same frequency band in a time division multiplexed manner, and a high degree of correlation may exist between the downlink and uplink channel responses. For the TDD system, the transmitter system can estimate the uplink channel response (e.g., based on the pilot transmitted by the receiver system on the uplink) and derive the downlink channel response by accounting for differences between the transmit and receive antenna arrays and front-end processing.

In an embodiment, the MIMO channel response estimates are provided to transmitter unit 400 as a sequence of $N_R \times N_T$ matrices of time-domain samples, $\hat{x}(n)$. The (i, j)-th element of the estimated channel impulse response matrix $\hat{x}(n)$, for $1 \leq i \leq N_R$ and $1 \leq j \leq N_T$, is a sequence of L+1 samples representing the sampled impulse response of the propagation path from the j-th transmit antenna to the i-th receive antenna. In this case, the response of the MIMO channel is time limited to L symbol periods.

Precoder 418 receives and precodes the modulation symbol streams, s(n), to provide precoded symbol streams, c(n). The precoding may be performed as shown in equation (5) and is based on the impulse response of $F_0F(l)$ for the equivalent channel for the equalized symbols, $\tilde{s}(n)$. This equivalent channel impulse response $F_0F(l)$ may be derived at transmitter unit 400 based on a model that includes (1) the MIMO channel with the estimated impulse response of $\hat{x}(n)$, (2) a decision feedback equalizer adapted to provide the recovered symbols, $\hat{s}(n)$, and (3) the processing with the matrices V(k) and U(k) at the transmitter and receiver, respectively. For this model, the modulation symbols, s(n), are transmitted over the MIMO channel, and the output of the MIMO channel may be expressed as:

$$\underline{b}(n) = \sum_{l=0}^{L} \hat{H}(l)\underline{s}(n-l). \quad \text{Eq (10)}$$

The decision feedback equalizer in the model then forms an initial estimate, s'(n), of the modulation symbols, s(n), which may be expressed as:

$$\underline{s}'(n) = \sum_{l=-K_1}^{0} M_{ftx}(l)\underline{b}(n-l) + \sum_{l=1}^{K_2} M_{btx}(l)\underline{\check{s}}(n-l), \quad \text{Eq (11)}$$

where š(n) are the remodulated symbols, which may be set equal to s(n), i.e., š(n)=s(n);

$M_{ftx}(l)$ is an $N_T \times N_R$ impulse response matrix for the feed-forward filter, with each element of $M_{ftx}(l)$ comprising a sequence of ($K_1$+1) coefficients; and $M_{btx}(l)$ is an $N_T \times N_T$ impulse response matrix for the feedback filter, with each element of $M_{btx}(l)$ comprising a sequence of $K_2$ coefficients.

The feed-forward and feedback matrices may be derived based on various criteria, as is known in the art. Derivation of these matrices based on a minimum mean square error (MMSE) criterion is described in U.S. patent application Ser. No. 09/993,087, entitled "Multiple-Access Multiple-Input Multiple-Output (MIMO) Communication System," filed Nov. 6, 2001, and U.S. patent application Ser. No. 10/017,308, entitled "Time-Domain Transmit and Receive Processing with Channel Eigenmode Decomposition with MIMO Systems," filed Dec. 7, 2001, both of which are assigned to the assignee of the present application and incorporated herein by reference.

The equivalent channel impulse response $F_0F(l)$ may then be derived as:

$$\underline{F}_0\underline{F}(l) = \sum_{i=0}^{L} M_{ftx}(l-i)\underline{\Gamma}(i). \quad \text{Eq (12)}$$

Precoder 418 precodes the modulation symbol streams, s(n), based on the equivalent channel impulse response $F_0F(l)$, which may be derived as shown in equation (12), to provide the precoded symbol streams, c(n).

TX MIMO processor 320a then performs MIMO processing on the precoded symbol streams, c(n), to orthogonalize the symbol streams at the receiver system. As noted above, the MIMO processing may be performed in the time domain or frequency domain.

Spatio-temporal pulse-shaping is a technique for performing MIMO processing in the time domain. At the transmitter system, the channel frequency response matrix, H(k), may be decomposed into the unitary matrices V(k) and U(k) and the diagonal matrix λ(k), as shown in equation (1). The diagonal matrix λ(k) may be used to derive a diagonal matrix $E_\lambda(k)$ that indicates the energies (or transmit powers) assigned to the eigenmodes in frequency bin k. The energy assignment may be performed, for example, based on a well-known "water-filling" transmit energy distribution technique that assigns more energy to better eigenmodes and less energy to poorer eigenmodes such that the overall spectral efficiency is maximized.

The matrices V(k) and $E_\lambda(k)$ are then used to derive a spatio-temporal pulse-shaping matrix, $P_{tx}(n)$, which is further used to precondition the precoded symbols in the time domain at the transmitter. Correspondingly, the matrix U(k) is used to derive a spatio-temporal pulse-shaping matrix, $\underline{u}(l)$, which is further used to precondition the symbols in the time domain at the receiver. Using spatio-temporal pulse-shaping, one symbol stream may be transmitted over all frequency bins of a given spatial subchannel. This then allows for separate coding/modulation per spatial subchannel, which can simplify the equalization of the received symbol streams, r(n), at the receiver.

TX MIMO processor 320a performs spatial-temporal pulse-shaping on the precoded symbol streams. Within TX MIMO processor 320a, a fast Fourier transformer 422 receives the estimated channel impulse response matrix, $\hat{x}(n)$, (e.g., from the receiver system) and derives the corresponding estimated channel frequency response matrix, $\hat{H}(k)$, by performing a fast Fourier transform (FFT) on $\hat{x}(n)$ (i.e., $\hat{H}(k)=FFT[\hat{x}(n)]$). This may be achieved by performing an $N_F$-point FFT on a sequence of $N_F$ samples for each element of $\hat{x}(n)$ to obtain a corresponding sequence of $N_F$ coefficients for the corresponding element of $\hat{H}(k)$, where $N_F \geq (L+1)$. The $N_R \cdot N_T$ elements of $\hat{H}(k)$ are thus $N_R \cdot N_T$ sequences representing the frequency responses of the propagation paths between the $N_T$ transmit antennas and $N_R$ receive antennas. Each element of $\hat{H}(k)$ is the FFT of the corresponding element of $\hat{x}(n)$.

A block 424 then performs singular value decomposition of the estimated channel frequency response matrix, $\hat{H}(k)$, for each value of k, where $0 \leq k \leq (N_F-1)$ and $N_F$ is the length of the FFT. The singular value decomposition may be expressed as shown in equation (1), which is:

$$\hat{H}(k) = U(k)\lambda(k)V^H(k).$$

The result of the singular value decomposition is three sequences of $N_F$ matrices, U(k), λ(k), and $V^H(k)$, for $0 \leq k \leq (N_F-1)$. For each frequency bin k, U(k) is the $N_R \times N_R$ unitary matrix of left eigenvectors of $\hat{H}(k)$, V(k) is the $N_T \times N_T$ unitary matrix of right eigenvectors of $\hat{H}(k)$, and λ(k) is the $N_R \times N_T$ diagonal matrix of singular values of $\hat{H}(k)$. The matrices V(k) and U(k) may be used to precondition symbols at the transmitter and receiver, respectively.

The elements along the diagonal of λ(k) are $\lambda_{ii}(k)$ for $1 \leq i \leq r(k)$, where r(k) is the rank of $\hat{H}(k)$. The columns of U(k) and V(k), $u_i(k)$ and $v_i(k)$, respectively, are solutions to an eigen equation, which may be expressed as:

$$\hat{H}(k)v_i(k) = \lambda_{ii}u_i(k) \quad \text{Eq (13)}$$

The U(k), λ(k), and V(k) matrices may be provided in two forms—a "sorted" form and a "random-ordered" form. In the sorted form, the diagonal elements of λ(k) are sorted in decreasing order so that $\lambda_{11}(k) \geq \lambda_{22}(k) \geq \ldots \geq \lambda_{rr}(k)$, and their eigenvectors are arranged in corresponding order in U(k) and V(k). The sorted form is indicated herein by the subscript s, i.e., $U_s(k)$, $\lambda_s(k)$, and $V_s(k)$. In the random-ordered form, the ordering of the singular values and eigenvectors is random and independent of frequency. The random form is indicated herein by the subscript r. The particular form selected for use, either sorted or random-ordered, determines the eigenmodes to be used for the data transmission and the coding and modulation scheme to be used for each selected eigenmode.

A water-filling analysis block 426 then receives (1) the set of singular values for each frequency bin k, which is contained in the sequence of matrices, λ(k), and (2) CSI that includes the received SNR corresponding to each singular value. The received SNR is the SNR achieved at the receiver for the recovered symbol stream, as described below. The matrices λ(k) are used in conjunction with the received SNRs to derive the sequence of diagonal matrices, $E_\lambda(k)$, which are the solution to the water-filling equations given in the aforementioned U.S. patent application Ser. No. 10/017, 308. The diagonal matrices $E_\lambda(k)$ contain the set of energies or transmit powers assigned to the eigenmodes for each of the $N_F$ frequency bins.

The water-filling technique is described by Robert G. Gallager, in "Information Theory and Reliable Communication," John Wiley and Sons, 1968, which is incorporated herein by reference. The water-filling analysis to derive the diagonal matrices, $E_\lambda(k)$, may be performed as described in the aforementioned U.S. patent application Ser. No. 10/017, 308 and in U.S. patent application Ser. No. 09/978,337, entitled "Method and Apparatus for Determining Power Allocation in a MIMO Communication System," filed Oct. 15, 2001, which is assigned to the assignee of the present application and incorporated herein by reference.

A scaler/IFFT 428 receives the unitary matrices, V(k), and the diagonal matrices, $E_\lambda(k)$, for all $N_F$ frequency bins, and derives a spatio-temporal pulse-shaping matrix, $P_{tx}(n)$, for the transmitter based on the received matrices. Initially, the square root of the diagonal matrices, $E_\lambda(k)$, is computed to derive a sequence of diagonal matrices, $\sqrt{E_\lambda(k)}$, whose elements are the square roots of the elements of $E_\lambda(k)$. The elements of the diagonal matrices, $E_\lambda(k)$, are representative of the transmit power allocated to the eigenmodes. The square root then transforms the power allocation to the equivalent signal scaling. The product of the square-root diagonal matrices, $\sqrt{E_\lambda(k)}$, and the unitary matrices, V(k), which are the sequence of matrices of right eigen-vectors of $\hat{H}(k)$, is then computed. This product, $V(k)\sqrt{E_\lambda(k)}$, defines the "optimal" spatio-spectral shaping to be applied to the precoded symbol vector, c(n).

An inverse FFT of the product $V(k)\sqrt{E_\lambda(k)}$ is then computed to derive the spatio-temporal pulse-shaping matrix, $P_{tx}(l)$, for the transmitter, which may be expressed as:

$$\underline{P}_{tx}(l) = IFFT\left[\underline{V}(k)\sqrt{E_\lambda(k)}\right]. \quad \text{Eq (14)}$$

The pulse-shaping matrix, $P_{tx}(l)$, is an $N_T \times N_T$ matrix, with each element of $P_{tx}(l)$ comprising a sequence of $N_F \geq L+1$ values. Each column of $P_{tx}(l)$ is a steering vector for a corresponding element of c(n).

A convolver 430 receives and preconditions (e.g., convolves) the precoded symbol vector, c(n), with the pulse-shaping matrix, $P_{tx}(l)$, to derive the transmitted signal vector, x(n). The convolution of c(n) with $P_{tx}(l)$ may be expressed as:

$$x(n) = \sum \underline{P}_{tx}(l)\underline{c}(n-l). \quad \text{Eq (15)}$$

The matrix convolution shown in equation (15) may be performed as follows. To derive the i-th element of the vector x(n) for time n, $x_i(n)$, the inner product of the i-th row of the matrix $P_{tx}(l)$ with the vector c(n−l) is formed for a number of delay indices (e.g., $0 \leq l \leq L$), and the results are accumulated to derive the element $x_i(n)$. The signal transmitted on each transmit antenna (i.e., each element of x(n), or $x_i(n)$) is thus formed as a weighted combination of the $N_T$ precoded symbol streams for a number of symbol periods, with the weighting determined by the appropriate row of the matrix $P_{tx}(l)$. The process is repeated such that each element of the vector x(n) is derived from a respective row of the matrix $P_{tx}(l)$ and the vector c(n).

Each element of the transmitted signal vector, x(n), corresponds to a stream of preconditioned symbols to be transmitted over a respective transmit antenna. The $N_T$ preconditioned symbol streams (i.e., a sequence of preconditioned symbol vectors, with each vector including up to $N_T$ preconditioned symbols) are also denoted as $N_T$ transmitted signals. The $N_T$ preconditioned symbol streams are provided to transmitters 322a through 322t and processed to derive $N_T$ modulated signals, which are then transmitted from $N_T$ antennas 324a through 324t.

The embodiment shown in FIG. 4 performs time-domain beam-steering of the precoded symbol vector, c(n). The beam-steering may also be performed in the frequency domain. In this case, the vector c(n) may be transformed via an FFT to obtain a frequency-domain vector C(k). The vector C(k) is then multiplied with the matrix $$\underline{V}(k)\sqrt{E_\lambda(k)}$$

to obtain a frequency-domain vector X(k), as follows:

$$\underline{X}(k) = \left[\underline{V}(k)\sqrt{E_\lambda(k)}\right]\underline{C}(k).$$

The transmitted signal vector, x(n), may then be derived by performing an IFFT on the vector X(k), i.e., x(n)=IFFT [X(k)].

Figure 5:
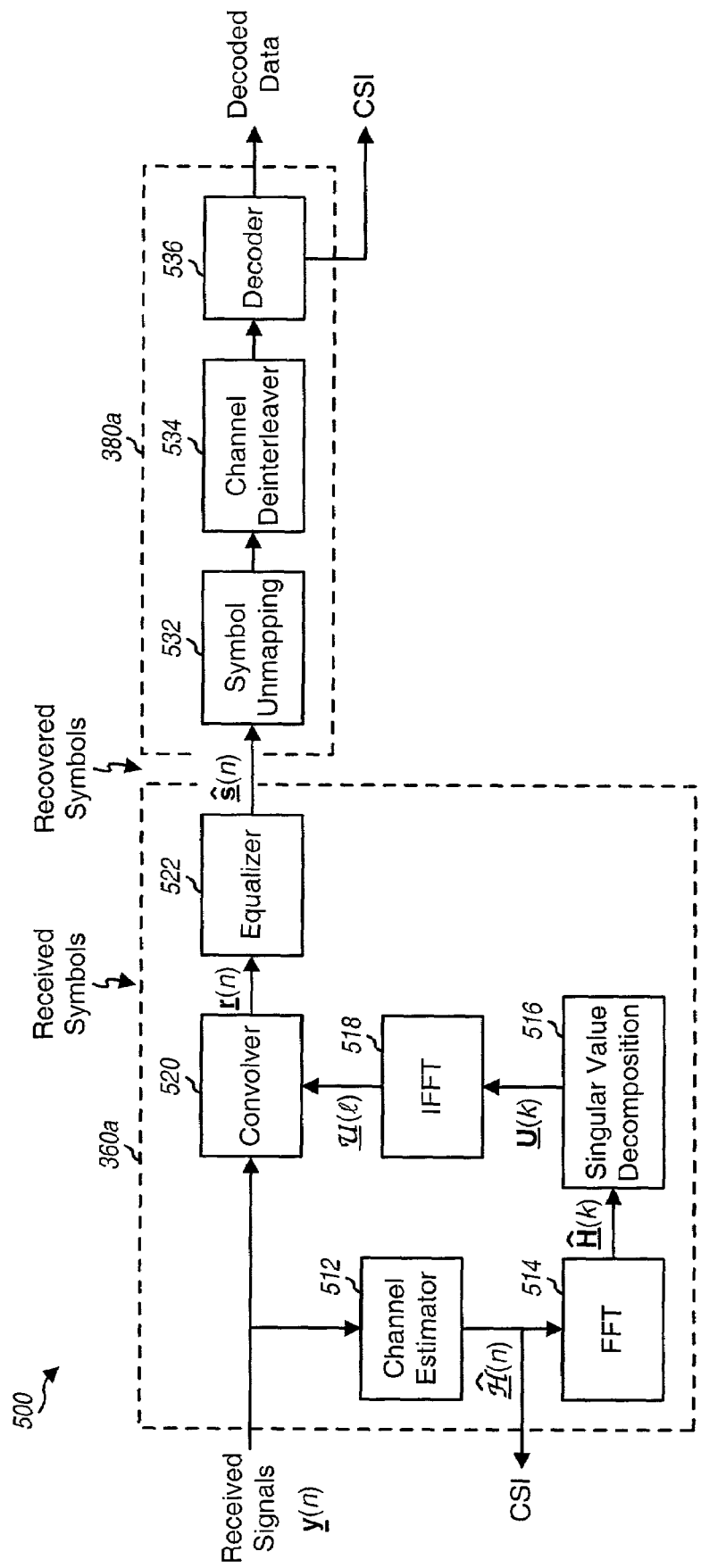
FIG. 5 is a block diagram of an embodiment of a receiver unit that may be used in conjunction with the transmitter unit in FIG. 4.

FIG. 5 is a block diagram of an embodiment of a receiver unit 500, which is a specific embodiment of the receiver portion of receiver system 350 in FIG. 3. Receiver unit 500 includes (1) an RX MIMO processor 360a that processes $N_R$ received sample streams to provide $N_T$ recovered symbol streams, and (2) an RX data processor 380a that demodulates, deinterleaves, and decodes the recovered symbols to provide decoded data. RX MIMO processor 360a and RX data processor 380a are one embodiment of RX MIMO processor 360 and RX data processor 380, respectively, in FIG. 3.

Referring back to FIG. 3, the modulated signals transmitted from $N_T$ transmit antennas are received by each of $N_R$ antennas 352a through 352r, and the received signal from each antenna is routed to a respective receiver 354 (which is also referred to as a front-end unit). Each receiver 354 conditions (e.g., filters, amplifies, and downconverts) a respective received signal and digitizes the conditioned signal to provide a corresponding stream of samples. Receivers 354a through 354r provide $N_R$ sample streams (i.e., a sequence of received signal vectors, y(n), with each vector including up to $N_R$ samples). The $N_R$ sample streams are then provided to RX MIMO processor 360a.

Within RX MIMO processor 360a, a channel estimator 512 receives the sample streams, y(n), and derives an estimated channel impulse response matrix, $\hat{\mathcal{H}}(n)$, which may be sent back to the transmitter system and used to perform the preceding and MIMO processing. An FFT 514 then performs an FFT on the estimated channel impulse response matrix, $\hat{\mathcal{H}}(n)$, to derive the estimated channel frequency response matrix, $\hat{H}(k)$.

A block 516 then performs singular value decomposition of $\hat{H}(k)$, for $0 \leq k \leq (N_F-1)$, to obtain the matrix of left eigen-vectors, U(k), for each frequency bin. Each column of U(k) is a steering vector in frequency bin k for a corresponding element of s(n), and is used to orthogonalize the symbol streams at the receiver system. An IFFT 518 then performs the inverse FFT of U(k) to derive a spatio-temporal pulse-shaping matrix, $\underline{\mathcal{U}}(l)$, for the receiver system.

A convolver 520 then derives the received symbol vector, r(n), by performing a convolution of the received signal vector, y(n), with the conjugate transpose of the spatio-temporal pulse-shaping matrix, $\underline{\mathcal{U}}^H(l)$. This convolution may be expressed as:

$$\underline{r}(n) = \sum \underline{\mathcal{U}}^H(l)\underline{y}(n - l). \qquad \text{Eq (16)}$$

The pulse-shaping at the receiver may also be performed in the frequency domain, similar to that described above for the transmitter. In this case, the received signal vector, y(n), may be transformed via an FFT to obtain a frequency-domain vector Y(k). The vector Y(k) is then pre-multiplied with the conjugate transpose matrix $U^H(k)$ to obtain a frequency-domain vector R(k). The result of this matrix multiplication, R(k), can then be transformed via an inverse FFT to obtain the time-domain received symbol vector, r(n). The convolution of the vector y(n) with the matrix $\underline{\mathcal{U}}^H(l)$ can thus be represented in the discrete frequency domain as:

$$R(k)=U^H(k)Y(k)=\hat{\lambda}(k)C(k)+\hat{Z}(k), \qquad \text{Eq (17)}$$

where $\hat{\lambda}(k)=\lambda(k)\sqrt{E_\lambda(k)}$ is a matrix of weighted singular values of $\hat{H}(k)$, with the weights being the square root of the water-filling solution, $\sqrt{E_\lambda(k)}$;

C(k) is the FFT of c(n), the precoded symbol vector;
Y(k) is the FFT of y(n), the received signal vector;
R(k) is the FFT of r(n), the received symbol vector; and
$\hat{Z}(k)$ is the FFT of $\hat{z}(n)$ the received noise process as transformed by the unitary matrix $U^H(k)$.

From equation (17), the received symbol vector, r(n), may be characterized as a convolution in the time domain, as follows:

$$\underline{r}(n) = \sum_l \Lambda(l)\underline{c}(n - l) + \hat{\underline{z}}(n), \qquad \text{Eq (18)}$$

where
$\Lambda(l)$ is the inverse FFT of $$\hat{\lambda}(k) = \lambda(k)\sqrt{E_\lambda(k)}\text{; and}$$

$\hat{z}(n)$ is the received noise, as transformed by the receiver spatio-temporal pulse-shaping matrix, $\underline{\mathcal{U}}^H(l)$.

The matrix $\Lambda(l)$ is a diagonal matrix of eigen-pulses, with each eigen-pulse being derived as the IFFT of the corresponding sequence of singular values in $\hat{\lambda}(k)$ for $0 \leq k \leq (N_F-1)$.

The two forms for ordering the singular values, sorted and random-ordered, result in two different types of eigen-pulses. For the sorted form, the resulting eigen-pulse matrix, $\Lambda_s(l)$, is a diagonal matrix of pulses that are sorted in descending order of energy content. The pulse corresponding to the first diagonal element of the eigen-pulse matrix, $\{\Lambda_s(l)\}_{11}$, has the most energy, and the pulses corresponding to elements further down the diagonal have successively less energy. Furthermore, when the SNR is low enough that water-filling results in some of the frequency bins having no energy, the energy is taken out of the smallest eigen-pulses first. Thus, at low SNRs, one or more of the eigen-pulses may have no energy. This has the advantage that at low SNRs, the coding and modulation are simplified through the reduction in the number of orthogonal subchannels. However, in order to approach channel capacity, it is necessary to code and modulate separately for each eigen-pulse.

The random-ordered form of the singular values in the frequency domain may be used to simplify coding and modulation (i.e., to avoid the complexity of separate coding and modulation for each element of the eigen-pulse matrix). In the random-ordered form, for each frequency bin, the ordering of the singular values is random instead of being based on their size. This random ordering can result in approximately equal energy in all of the eigen-pulses. When the SNR is low enough to result in frequency bins with no energy, these bins are spread approximately evenly among the eigenmodes so that the number of eigen-pulses with non-zero energy is the same independent of SNR. At high SNRs, the random-order form has the advantage that all of the eigen-pulses have approximately equal energy, in which case separate coding and modulation for different eigen-modes is not required.

If the response of the MIMO channel is frequency selective (i.e., different values in H(k) for different values of k), then the eigen-pulses in the matrix $\Lambda(l)$ are time-dispersive. In this case, the resulting received symbol sequences, r(n), have inter-symbol interference (ISI) that will in general require equalization to provide high performance. Furthermore, because the singular values in $\lambda(k)$ are real, the elements of $\hat{\lambda}(k)=\lambda(k)\sqrt{E_\lambda(k)}$ are also real, and the eigen-pulses in the matrix $\Lambda(l)$ exhibit aliased conjugate symmetry properties. If steps are taken to avoid this time-domain aliasing (e.g., by using an FFT length, $N_F$, that is sufficiently greater than the number of non-zero samples in the estimated channel impulse response matrix, $\hat{x}(n)$) then the eigen-pulse matrix is conjugate symmetric in the delay variable, l, i.e., $\Lambda(l)=\Lambda^*(-l)$.

An equalizer 522 receives and performs space-time equalization on the received symbol vector, r(n), to obtain the recovered symbol vector, ŝ(n), which is an estimate of the modulation symbol vector, s(n). The equalization is described in further detail below. The recovered symbol vector, ŝ(n), is then provided to RX data processor 380*a*.

Within RX data processor 380*a*, a symbol unmapping element 532 demodulates each recovered symbol in ŝ(n) in accordance with a demodulation scheme (e.g., M-PSK, M-QAM) that is complementary to the modulation scheme used for that symbol at the transmitter system. The demodulated data from symbol unmapping element 532 is then de-interleaved by a deinterleaver 534, and the deinterleaved data is further decoded by a decoder 536 to obtain the decoded data, which is an estimate of the transmitted traffic data. The deinterleaving and decoding are performed in a manner complementary to the interleaving and encoding, respectively, performed at the transmitter system. For example, a Turbo decoder or a Viterbi decoder may be used for decoder 536 if Turbo or convolutional coding, respectively, is performed at the transmitter system.

Decision Feedback Equalization

As shown above in equation (12), the transmitter system may derive the equivalent channel impulse response $F_0F(l)$ (which is used to precode the modulation symbols) based on the channel impulse response estimate $\hat{x}(l)$ and the impulse response $M_{ftx}(l)$ of a feed-forward filter of a decision feedback equalizer. The receiver system also performs equalization of the received symbol vector based on a feed-forward filter. A specific design of a decision feedback equalizer is described below.

Although the outputs of the feed-forward filters at the transmitter and receiver systems may be similar, the impulse response $M_{ftx}(l)$ of the feed-forward filter at the transmitter system may be different from the impulse response $M_{frx}(l)$ of the feed-forward filter at the receiver system because different inputs are provided to these filters.

As described above, an equivalent channel for the received symbol vector, r(n), may be defined to have an impulse response of $\Lambda(l)$ and a corresponding frequency response of $\lambda(f)$. The end-to-end frequency response of this equivalent channel and its matched filter, $\psi(f)=\lambda(f)\lambda'(f)$, may be spectrally factorized into a hypothetical filter and its matched filter having an end-to-end frequency response of $\gamma(f)\gamma^H(f)=\psi(f)$. The hypothetical filter may be defined to have a causal impulse response of $\Gamma(l)$ and a corresponding frequency response of $\gamma(f)$.

In the following analysis, an equivalent channel model may be defined to have spectrally white noise. This may be achieved by applying a noise-whitening filter having a frequency response matrix of $(\gamma^H(f))^+=(\gamma(f)\gamma^H(f))^{-1}\gamma(f)$, which is the Moore-Penrose inverse of $\gamma^H(f)$, to the output of the receiver matched filter. The overall frequency response of the channel (with frequency response of $\lambda(f)$), the matched filter (with frequency response of $\lambda'(f)$), and the noise-whitening filter (with frequency response of $(\gamma^H(f))^+$) may then be expressed as:

$$\lambda(f)\lambda'(f)(\gamma^H(f))^+=\psi(f)(\gamma^H(f))^+=\gamma(f). \qquad \text{Eq (19)}$$

Figure 6A:
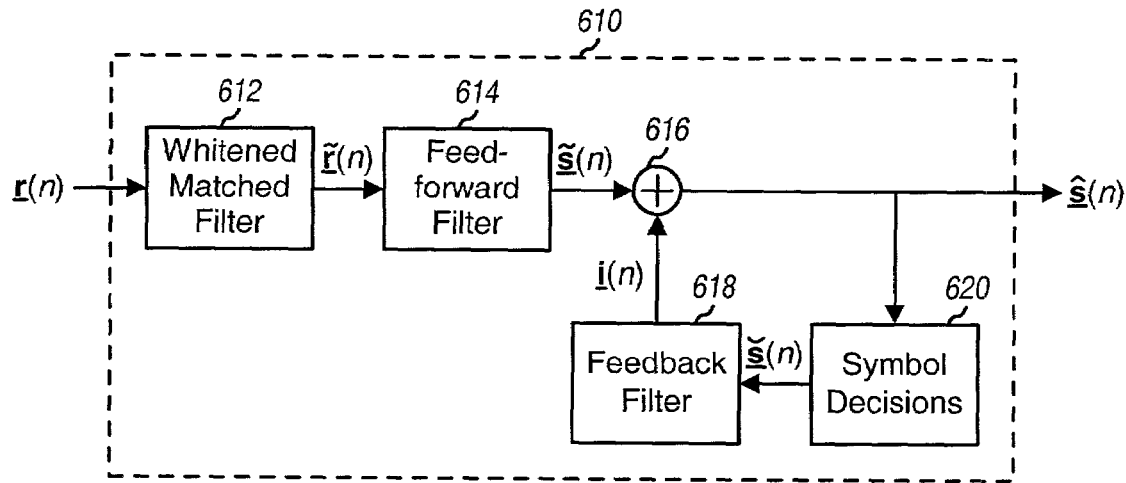
FIG. 6A is a block diagram of a decision feedback equalizer derived based on an equivalent channel model.

FIG. 6A is a block diagram of a decision feedback equalizer 610 derived based on the equivalent channel model described above. The received symbol vector, r(n), is filtered by a (hypothetical) whitened matched filter 612 having a response of $\lambda'(f)(\gamma^H(f))^+$ to provide a filtered symbol vector, r̃(n). The whitened matched filter performs the dual function of matched filtering for r(n) and noise whitening, and is used to simplify the derivation for the decision feedback equalizer. In a practical implementation, the response of the whitened matched filter is (automatically) incorporated within the response of the decision feedback equalizer when the equalizer is adapted based on the selected criterion (e.g., the minimum mean square error).

The filtered symbol vector, r̃(n), is the output of the equivalent channel model and may be expressed as:

$$\tilde{r}(n) = \sum_{l=0}^{L} \Gamma(l)s(n-l) + z(n) = \underline{\Gamma}\,\underline{s}(n) + \tilde{z}(n), \qquad \text{Eq (20)}$$

where $\underline{\Gamma}$ is a block-structured matrix composed of L+1 blocks with dimensionality $N_R \times N_T$ that represents a sequence of matrices, $\Gamma(l)$, for the sampled channel-whitened eigen-pulses and can be represented as:

$$\underline{\Gamma}=[\Gamma(0)\ \Gamma(1)\ \ldots\ \Gamma(L)],$$

and s(n) is a sequence of (L+1) vectors of modulation symbols and may be represented as:

$$\underline{s}(n) = \begin{bmatrix} s(n) \\ s(n-1) \\ \vdots \\ s(n-L) \end{bmatrix}.$$

Each vector of s(n) comprises up to $(L+1)N_T$ symbols and each symbol in the vector is associated with one of the eigen-pulses in the matrix $\underline{\Gamma}$. The blocks of $\underline{\Gamma}$ (i.e., $\Gamma(0)$, $\Gamma(1)$, ..., $\Gamma(L)$) are all diagonal.

The filtered symbol vector, $\tilde{r}(n)$, is further filtered by a feed-forward filter 614 having an impulse response of $M_f(l)$ to provide the equalized symbol vector, $\check{s}(n)$. The vector $\check{s}(n)$ from feed-forward filter 614 is then summed with the distortion estimate, i(n), from a feedback filter 618 by a summer 616 to derive an initial estimate, s'(n), of the transmitted symbol vector, s(n). This initial estimate, s'(n), is further scaled to provide the recovered symbol vector, ŝ(n). (The scaling of s'(n) to derive ŝ(n) is not shown in FIG. 6A for simplicity.) This vector ŝ(n) is also provided to a symbol decision element 620 to derive the remodulated symbol vector, š(n), which represents the detected symbols for ŝ(n). The remodulated symbol vector, š(n), may be derived by (1) demodulating the recovered symbol vector, ŝ(n), to provide demodulated data, (2) possibly deinterleaving, decoding, re-coding, and interleaving the demodulated data, and (3) remodulating the demodulated data based on the signal constellations corresponding to the selected modulation schemes. The remodulated symbol vector, š(n), is then filtered by feedback filter 618 with an impulse response of $M_b(l)$, and the output of feedback filter 618 is provided to summer 616.

A decision feedback equalizer (DFE) used in conjunction with the wideband eigenmode transmission forms an initial estimate, s'(n), of the transmitted symbol vector, s(n), at time n, which can be expressed as:

$$s'(n) = \sum_{l=-K_1}^{0} \underline{M}_f(l)\tilde{r}(n-l) + \sum_{l=1}^{K_2} \underline{M}_b(l)\check{\underline{s}}(n-l), \quad \text{Eq (21)}$$

where
 $\tilde{r}(n)$ is the filtered symbol vector from the equivalent channel model;
 š(n) is the remodulated symbol vector;
 $M_f(l)$ is a sequence of $(K_1+1)$ feed-forward matrices, with each matrix including $N_T \times N_R$ coefficients; and
 $M_b(l)$, is a sequence of $K_2$ feedback matrices, with each matrix including $N_T \times N_T$ coefficients.

Equation (21) can also be expressed as:

$$\underline{s}'(n) = \underline{\underline{M}}_f \underline{\tilde{r}}(n) + \underline{\underline{M}}_b \underline{\check{s}}(n), \quad \text{Eq (22)}$$

where $\underline{\underline{M}}_f = [\underline{M}_f(-K_1) \underline{M}_f(-K_1+1) \cdots \underline{M}_f(0)];$ $\underline{\underline{M}}_b = [\underline{M}_b(1) \underline{M}_b(2) \cdots \underline{M}_b(K_2)];$ -continued $$\underline{\check{s}}(n) = \begin{bmatrix} \check{\underline{s}}(n-1) \\ \check{\underline{s}}(n-2) \\ \vdots \\ \check{\underline{s}}(n-K_2) \end{bmatrix}; \text{ and } \underline{\tilde{r}}(n) = \begin{bmatrix} \tilde{r}(n+K_1) \\ \tilde{r}(n+K_1-1) \\ \vdots \\ \tilde{r}(n) \end{bmatrix}.$$

If the MMSE criterion is used to determine the feed-forward and feedback coefficient matrices, then the solutions for $\underline{\underline{M}}_f$ and $\underline{\underline{M}}_b$ that minimize the mean square error (MSE), $$\epsilon = E\{e^H(n)e(n)\},$$

can be used, where the error e(n) is expressed as:

$$e(n) = s'(n) - s(n). \quad \text{Eq (23)}$$

The feed-forward and feedback filters are typically adjusted simultaneously to minimize the mean square error of the inter-symbol interference in the recovered symbols.

The MMSE solution for the feed-forward filter, $M_f(l)$, for $-K_1 \leq l \leq 0$, is determined by the following linear constraints:

$$\sum_{l=-K_1}^{0} \underline{M}_f(l) \left[ \sum_{i=0}^{-l} \underline{\Gamma}(i)\underline{\Gamma}^H(i+l-m) + N_0 I \delta(l-m) \right] = \underline{\Gamma}^H(-m), \quad \text{Eq (24)}$$

and can also be expressed as:

$$\underline{\underline{M}}_f = \underline{\tilde{\Gamma}}^H \underline{\tilde{\varphi}}_{\tilde{r}\tilde{r}}^{-1}, \quad \text{Eq (25)}$$

where $$\underline{\tilde{\Gamma}} = \begin{bmatrix} \underline{0}_{(K_1-L)N_R \times N_T} \\ \underline{\Gamma}(L) \\ \underline{\Gamma}(L-1) \\ \vdots \\ \underline{\Gamma}(0) \end{bmatrix},$$

and $$\underline{\tilde{\varphi}}_{\tilde{r}\tilde{r}}$$

is a $(K_1+1)N_R \times (K_1+1)N_R$ matrix made up of $N_R \times N_R$ blocks. The (i, j)-th block in $$\underline{\tilde{\varphi}}_{\tilde{r}\tilde{r}}$$

is given by:

$$\tilde{\varphi}_{\vec{r}\vec{r}}(i, j) = \sum_{l=0}^{K_1-i+1} \Gamma(l)\Gamma^H(l+i-j) + N_0 I \delta(i-j). \quad \text{Eq (26)}$$

The MMSE solution for the feedback filter may be expressed as:

$$M_b(l) = -\sum_{i=-K_1}^{0} M_f(i)\Gamma(l-i), \text{ for } 1 \le l \le K_2$$

$$= -\underline{\underline{M}}_f \hat{\underline{\Gamma}},$$

where $\hat{\underline{\Gamma}} = \left[ \hat{\underline{\Gamma}}_{=1} \hat{\underline{\Gamma}}_{=2} \cdots \hat{\underline{\Gamma}}_{=L} \underline{0}_{(K_1+1)N_R \times (K_2-L)N_T} \right]$, and $\hat{\underline{\Gamma}}_l = \begin{bmatrix} \underline{0}_{(K_1-L+l)N_R \times N_T} \\ \Gamma(L) \\ \vdots \\ \Gamma(l) \end{bmatrix}$.

Since the matrices $\Gamma(l)$, for $0 \le l \le L$, are diagonal, then from equation (25), the feed-forward filter coefficient matrices, $M_f(l)$, for $-K_1 \le l \le 0$, are also diagonal. It then follows that the feedback filter coefficient matrices, $M_b(l)$, for $1 \le l \le K_2$, are also diagonal.

The feed-forward filter and feedback filter have frequency response matrices $m_f(f)$ and $m_b(f)$, respectively, which are given by:

$$\underline{m}_f(f) = \sum_{l=-K_1}^{0} \underline{M}_f(l) e^{-j2\pi l f}, \text{ and} \quad \text{Eq (28)}$$

$$\underline{m}_b(f) = \sum_{l=1}^{K_2} \underline{M}_b(l) e^{-j2\pi l f}.$$

Substituting equation (27) into equation (21) and assuming perfect decisions (i.e., $\check{s}(n) = s(n)$), the initial symbol estimate, s'(n), may be expressed as:

$$\underline{s}'(n) = \underline{\underline{M}}_f \underline{\underline{\Gamma}} \underline{s}(n) + \underline{\underline{M}}_f \tilde{\underline{z}}(n), \quad \text{Eq (29)}$$

where $\tilde{\underline{z}}(n) = [\tilde{z}^T(n+K_1)\tilde{z}^T(n+K_1-1) \ldots \tilde{z}^T(n)]^T$.

To determine the SNR associated with the initial symbol estimate, s'(n), from the decision feedback equalizer, an unbiased minimum mean square error estimate is initially derived by finding the conditional mean value of the transmitted symbol vector:

$$E[\underline{s}'(n)|\underline{s}(n)] = \underline{\underline{M}}_f \underline{\underline{\Gamma}} \underline{s}(n) = \underline{G}_{dfe} \underline{s}(n), \quad \text{Eq (30)}$$

where $$\underline{G}_{dfe} = \underline{\underline{M}}_f \underline{\underline{\Gamma}} = \underline{\underline{\Gamma}}^H \underline{\varphi}_{\vec{r}\vec{r}}^{-1} \underline{\underline{\Gamma}}.$$

Next, the mean value of the i-th element of s'(n), $s_i'(n)$, is expressed as:

Eq (27)

$$E[s_i'(n)|s_i(n)] = g_{dfe,ii} s_i(n),$$

where $g_{dfe,ii}$ is the i-th diagonal element of $G_{dfe}$.

To form the unbiased symbol estimate, $\hat{s}(n)$, a diagonal matrix whose elements are the inverse of the diagonal elements of $G_{dfe}$ is first defined as:

$$\underline{D}_{Gdfe}^{-1} = diag(1/g_{dfe,11}, 1/g_{dfe,22}, \ldots, 1/g_{dfe,N_T N_T}). \quad \text{Eq (31)}$$

The unbiased estimate, $\hat{s}(n)$, may then be expressed as:

$$\hat{\underline{s}}(n) = \underline{D}_{Gdfe}^{-1} \underline{s}'(n) = \underline{D}_{Gdfe}^{-1} \left( \underline{\underline{M}}_f \tilde{\underline{r}}(n) + \underline{\underline{\tilde{M}}}_b \tilde{\underline{s}}(n) \right) \quad \text{Eq (32)}$$

$$= \underline{D}_{Gdfe}^{-1} \underline{\underline{M}}_f (\underline{\underline{\Gamma}} \underline{s}(n) + \tilde{\underline{z}}(n)).$$

The resulting error covariance matrix, $\phi_{ee}$, is given by:

$$\underline{\varphi}_{ee} = \underline{W}_{dfe} = E\left\{ \left[ \underline{s}(n) - \underline{D}_{Gdfe}^{-1} \underline{s}'(n) \right] \left[ \underline{s}^H(n) - \underline{s}'^H(n) \underline{D}_{Gdfe}^{-1} \right] \right\} \quad \text{Eq (33)}$$

$$= I - \underline{D}_{Gdfe}^{-1} \underline{G}_{dfe} - \underline{G}_{dfe}^H \underline{D}_{Gdfe}^{-1} + \underline{D}_{Gdfe}^{-1} \underline{G}_{dfe} \underline{D}_{Gdfe}^{-1}.$$

The SNR associated with the unbiased estimate, $\hat{s}_i(n)$, of the symbol transmitted on the i-th transmit antenna may then be expressed as:

$$SNR_i = \frac{1}{w_{dfe,ii}} = \frac{g_{dfe,ii}}{1 - g_{dfe,ii}}. \quad \text{Eq (34)}$$

The decision feedback equalizer is described in further detail in the aforementioned U.S. patent application Ser. Nos. 09/993,087 and 10/017,308 and in a paper by S. L. Ariyavistakul et al. entitled "Optimum Space-Time Processors with Dispersive Interference: Unified Analysis and Required Filter Span," IEEE Trans. on Communication, Vol. 7, No. 7, July 1999, which is incorporated herein by reference.

Figure 6B:
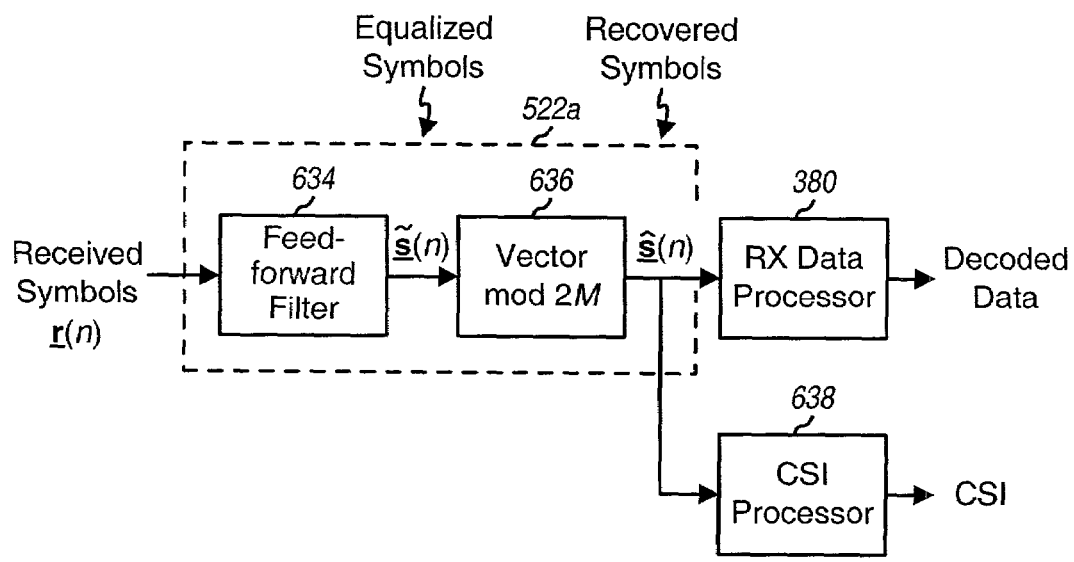
FIG. 6B is a block diagram of an equalizer for the receiver unit and which may be used in conjunction with the preceding at the transmitter unit.

FIG. 6B is a block diagram of an equalizer 522a that may be used in conjunction with precoding at the transmitter system. Within equalizer 522a, the received symbol vector, r(n), from RX MIMO processor 360 is filtered by a feed-forward filter 634 to provide the equalized symbol vector, s̃(n). The response of feed-forward filter 634 may be adapted based on the MMSE criterion, as described above, or based on some other linear spatial equalization technique.

Feed-forward filter 634 initially filters the received symbol vector, r(n), with the impulse response of $M_{fix}(l)$ to provide the initial estimate, s'(n), and further multiplies the initial estimate with the matrix $D_{Gdfe}-1$ to provide the equalized symbol vector, s̃(n), which is the unbiased estimate of the modulation symbol vector, s(n). The impulse response $M_{fix}(l)$ of the feed-forward filter may be adapted as shown in equation (25) for the MMSE criterion.

With preceding at the transmitter system, the equalized symbols fall on an expanded signal constellation. A unit 636 then prescales the equalized symbol vector, s̃(n), with $F_0^{-1}$ to compensate for the factor $F_0$ in equation (8) and further performs vector modulo-2M operation on the resultant vector, as shown in equation (9), to provide the recovered symbol vector, ŝ(n). The modulo-2M operation at the receiver effectively folds the expanded signal constellation back to the original signal constellation. RX data processor 380 then demodulates, deinterleaves, and decodes the recovered symbols to provide the decoded data. A CSI processor 638 may be used to estimate the SNR of each recovered symbol stream (e.g., based on equation (34)).

Because of the precoding at the transmitter system, the feedback filter is not needed for the decision feedback equalizer at the receiver system.

The decision feedback equalizer may also be adapted based on some other technique instead of the MMSE technique, and this is within the scope of the invention. For example, the decision feedback equalizer may be adapted based on a zero-forcing technique.

For certain classes of channel coding (e.g., Turbo and convolutional coding), the decoding at the receiver system is performed based on soft decisions (i.e., non-binary values) for the recovered symbols, instead of hard decisions. For improved performance, the soft decisions for symbols in the expanded signal constellation (i.e., the equalized symbols) may be used directly for decoding, and the modulo-2M operation may be omitted for the reasons described below.

The equalized symbol vector, s̃(n), after the feed-forward filter may be expressed as shown in equation (8), which is:

$$\tilde{s}(n) = E_0 \lfloor s(n) + 2M[\underline{\mu}(n) + j\underline{v}(n)] \rfloor + \tilde{z}(n).$$

The vector s̃(n) includes up to $N_T$ equalized symbols, and each equalized symbol, s̃$_i$(n), is an estimate of a corresponding modulation symbol, $s_i$(n), generated at the transmitter system based on a particular (e.g., $M^2$-QAM) signal constellation. The modulation symbol, $s_i$(n), is a particular ($x_i$, $y_i$) point in the 2-dimensional QAM signal constellation, and this ($x_i$, $y_i$) signal point is defined based on $2\log_2 M_i$ coded bits, with $\log_2 M_i$ coded bits being used to define $x_i$ and the other $\log_2 M_i$ coded bits being used to define $y_i$. Due to the product symmetry of a square QAM signal constellation and Gray code mapping, the coded bits used to define $x_i$ are independent of the coded bits used to define $y_i$. The ($x_i$, $y_i$) signal point in the 2-dimensional QAM signal constellation may thus be viewed as comprising two 1-dimensional signal points (i.e., $x_i$ and $y_i$), with each 1-D signal point belonging to an independent one-dimensional PAM signal constellation.

For each equalized symbol, s̃$_i$(n), to be demodulated and decoded, the demodulation process at the receiver system determines the most likely $2\log_2 M_i$ coded bits used to form the modulation symbol, $s_i$(n), corresponding to this equalized symbol, s̃$_i$(n). For soft-input decoding, a log-likelihood ratio (LLR) is computed for each of the $2\log_2 M_i$ coded bits that define the equalized symbol, s̃$_i$(n).

For the purpose of computing the LLRs for the coded bits, each QAM symbol s̃$_i$(n) may be considered to comprise two independent PAM symbols, Re{s̃$_i$(n)} and Im{s̃$_i$(n)}. Each PAM symbol is defined by $\log_2 M_i$ coded bits. The LLR is then computed for each of the $\log_2 M_i$ coded bits for either Re{s̃$_i$(n)} or Im{s̃$_i$(n)}.

The LLR for a given coded bit, $b_j$(n), for $0 \leq j \leq \log_2 M_i$, for either Re{s̃$_i$(n)} or Im{s̃$_i$(n)}, may be expressed as:

$$LLR(b_j) = \ln\left[\frac{Pr\{b_j = 0|s\}}{Pr\{b_j = 1|s\}}\right]. \quad \text{Eq (35)}$$

The following may also be expressed:

$$Pr\{b_j = x|s\} \cdot Pr\{s\} = \sum_{s \in S_j^x} Pr\{s, b_i\} = \sum_{s \in S_j^x} Pr\{s, A_i\} \quad \text{Eq (36)}$$

$$= \sum_{s \in S_j^x} Pr\{s, |A_i\} \cdot Pr\{A_i\},$$

where $A_i$=Re{s̃$_i$(n)} or Im{s̃$_i$(n)}, $S_j^0$ represents a set of $M_i$ PAM signal points for which $b_j$=0, and $S_j^1$ represents a set of $M_i$ PAM signal points for which $b_j$=1.

Equation (35) may then be expressed as:

$$LLR(b_j) = \ln\left[\frac{\sum_{s \in S_j^0} Pr\{s|A_i\} \cdot Pr\{A_i\}}{\sum_{s \in S_j^1} Pr\{s|A_i\} \cdot Pr\{A_i\}}\right]. \quad \text{Eq (37)}$$

In the special case where the symbols $A_i$ are equally likely to be transmitted, then equation (37) may be expressed as:

$$LLR(b_j) = \ln\left[\frac{Pr\{b_j = 0|A_i\}}{Pr\{b_j = 1|A_i\}}\right] = \ln\left[\frac{\sum_{s \in S_j^0} Pr\{s|A_i\}}{\sum_{s \in S_j^1} Pr\{s|A_i\}}\right]$$

$$= \ln\left[\frac{\sum_{s \in S_j^0} Pr\{A_i|s\}}{\sum_{s \in S_j^1} Pr\{A_i|s\}}\right] = \ln\left[\frac{\sum_{s \in S_j^0} e^{-\frac{(A_i-s)^2}{2\sigma^2}}}{\sum_{s \in S_j^1} e^{-\frac{(A_i-s)^2}{2\sigma^2}}}\right]. \quad \text{Eq (38)}$$

Since

-continued $$Pr\{A_j\} = \prod_{j=1}^{\log_2 M_i} Pr\{b_j\}, \text{ and} \quad \text{Eq (39)}$$

$$Pr\{s \mid A_j\} = e^{-\frac{(A_j-s)^2}{2\sigma^2}},$$

equation (37) may be expressed as:

$$LLR(b_j) = \ln \frac{\sum_{s \in S_j^0} \left( e^{-\frac{(A_j-s)^2}{2\sigma^2}} \cdot \prod_{k=1}^{\log_2 M_i} Pr\{b_k\} \right)}{\sum_{s \in S_j^1} \left( e^{-\frac{(A_j-s)^2}{2\sigma^2}} \prod_{k=1}^{\log_2 M_i} Pr\{b_k\} \right)} \quad \text{Eq (40)}$$

$$= \ln \frac{\sum_{s \in S_j^0} \left( e^{-\frac{(A_j-s)^2}{2\sigma^2}} \cdot \prod_{\substack{k=1 \\ k \neq j}}^{\log_2 M_i} Pr\{b_k\} \right)}{\sum_{s \in S_j^1} \left( e^{-\frac{(A_j-s)^2}{2\sigma^2}} \prod_{\substack{k=1 \\ k \neq j}}^{\log_2 M_i} Pr\{b_k\} \right)} + \ln \left[ \frac{Pr\{b_j = 0\}}{Pr\{b_j = 1\}} \right]$$

$$= LLR_e(b_j) + LLR_a(b_j),$$

where $LLR_e(b_j)$ represents "extrinsic" information for the coded bit $b_j$ and $LLR_a(b_j)$ represents a priori information for the coded bit $b_j$.

The a priori information $LLR_a(b_j)$ may be available from a separate source or may be estimated by an error correcting decoder (e.g., a Turbo, convolutional, or block decoder) and fed back to a symbol unmapping element. The detection and decoding may be performed based on an iterative scheme. One such iterative detection and decoding scheme is described in U.S. patent application Ser. No. 10/005,104, entitled "Iterative Detection and Decoding for a MIMO-OFDM system," filed Dec. 3, 2001, which is assigned to the assignee of the present application and incorporated herein by reference. When non-Gray symbol mapping is used to derive the modulation symbols at the transmitter, the iterative detection and decoding scheme may provide improved performance at the receiver.

Due to preceding at the transmitter system, the equalized symbol, $\tilde{s}_i(n)$, belongs to an expanded signal constellation (i.e., $Re\{\tilde{s}_i(n)\}$ and $Im\{\tilde{s}_i(n)\}$ belong to expanded PAM signal constellations). Performing the modulo-2M operation on $Re\{\tilde{s}_i(n)\}$ and $Im\{\tilde{s}_i(n)\}$ folds the expanded signal constellation back to the original signal constellation, which is the proper operation if hard decisions are to be obtained for $Re\{\tilde{s}_i(n)\}$ and $Im\{\tilde{s}_i(n)\}$. However, if channel coding is present and soft decisions are utilized to compute the coded bit LLRs for Turbo codes (or branch metric for soft decision Viterbi decoding of convolutional codes), then folding the expanded signal constellation before computing the bit LLRs or branch metrics may result in severe performance degradation of the decoder.

To provide improved decoding performance, the modulo-2M operation may be eliminated and the coded bit LLR computation may be performed on the expanded signal constellation. The sets $S_j^0$ and $S_j^1$ may be expanded to match the expanded signal constellation by adding 2M·d, where d is an integer, to each signal point in the original sets $S_j^0$ and $S_j^1$ to form the expanded sets $S_{je}^0$ and $S_{je}^1$, respectively. The LLR may then be computed as shown in equation (40) based on the expanded sets.

The range of possible values of d may be determined based on an ensemble of channel realizations. It has been found through simulation using a large number of channel realizations that d=−2, −1, 0, 1, 2 may be sufficient. For this range of d, the cardinality of the expanded sets $S_{je}^0$ and $S_{je}^1$ is five times larger than the original sets $S_j^0$ and $S_j^1$. This increases the complexity of the LLR computation. To reduce the complexity of the LLR computation with the expanded sets to the same complexity of the LLR computation with the original sets, only the signal points that are within $\pm M_i$ of the received signal point may be considered for the LLR or metric computation.

The preceding techniques described herein for a multipath channel in a MIMO system may be implemented in various wireless communication systems, including but not limited to MIMO and CDMA systems. These techniques may also be used for a MIMO system that implements OFDM. These techniques may also be used for the forward link and/or the reverse link.

The preceding techniques may also be implemented by various means. For example, these techniques may be implemented in hardware, software, or a combination thereof. For a hardware implementation, the elements used to perform various signal processing steps at the transmitter (e.g., to code and modulate the data, precode the modulation symbols, precondition the precoded symbols, and so on) and at the receiver (e.g., to precondition the received samples, equalize the received symbols, demodulate and decode the recovered or equalized symbols, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, some or all of the signal processing steps at each of the transmitter and receiver may be implemented with modules (e.g., procedures, functions, and so on) that perform the functions described herein. The software codes may be stored in a memory unit (e.g., memories 332 and 372 in FIG. 3) and executed by a processor (e.g., controllers 330 and 370). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a multiple-input multiple-output (MIMO) communication system, a method for processing data for transmission over a multipath MIMO channel, comprising:
coding data in accordance with one or more coding schemes to provide coded data;
modulating the coded data in accordance with one or more modulation schemes to provide modulation symbols;
precoding the modulation symbols based on an equivalent channel response derived based on the estimated response of the MIMO channel and a response of a feed-forward filter of a decision feedback equalizer to provide precoded symbols; and
preconditioning the precoded symbols based on an estimated response of the MIMO channel to provide preconditioned symbols for transmission over the MIMO channel.

2. The method of claim 1, wherein the precoded symbols for each symbol period comprise an estimate of inter-symbol interference caused by precoded symbols in prior symbol periods due to the multipath MIMO channel.

3. The method of claim 1, wherein the preceding is performed as:

$$\underline{c}(n) = vmod_{2M}\left[\underline{s}(n) - \sum_{l \neq 0} F(l)\underline{c}(n-l)\right],$$

where
c(n) is a vector of precoded symbols for symbol period n;
s(n) is a vector of modulation symbols for symbol period n;
F(l) is a sequence of matrices for the equivalent channel response; and
$vmod_{2M}$ is a vector modulo-2M arithmetic operation.

4. The method of claim 1, wherein the response of the feed-forward filter is adapted based on a minimum mean square error (MMSE) criterion.

5. The method of claim 1, wherein the response of the feed-forward filter is obtained based on a zero-forcing technique.

6. The method of claim 1, wherein the preconditioning is performed in the time domain using spatio-temporal pulse-shaping.

7. The method of claim 1, further comprising:
decomposing a first sequence of matrices for the estimated response of the MIMO channel to obtain a second sequence of matrices of eigen-vectors and a third sequence of matrices of singular values; and
deriving a pulse-shaping matrix based on the second and third sequences of matrices, wherein the preconditioning is performed based on the pulse-shaping matrix.

8. The method of claim 7, wherein the first sequence of matrices for the estimated response of the MIMO channel is decomposed based on singular value decomposition.

9. The method of claim 7, wherein the pulse-shaping matrix comprises a plurality of sequences of time-domain values, and wherein the preconditioning is performed in the time domain by convolving the precoded symbols with the pulse-shaping matrix.

10. The method of claim 7, wherein the pulse-shaping matrix comprises a plurality of sequences of frequency-domain values, and wherein the preconditioning is performed in the frequency domain by multiplying transformed precoded symbols with the pulse-shaping matrix.

11. The method of claim 1, wherein a separate coding and modulation scheme is used for each data stream transmitted over the MIMO channel.

12. The method of claim 1, wherein a common coding and modulation scheme is used for all data streams transmitted over the MIMO channel.

13. In a multiple-input multiple-output (MIMO) communication system, a method for processing data for transmission over a multipath MIMO channel, comprising:
coding data in accordance with one or more coding schemes to provide coded data;
modulating the coded data in accordance with one or more modulation schemes to provide modulation symbols;
determining an estimated response of the MIMO channel;
deriving an equivalent channel response based on the estimated response of the MIMO channel and a response of a feed-forward filter of a decision feedback equalizer;
precoding the modulation symbols based on the equivalent channel response to provide precoded symbols; and
preconditioning the precoded symbols based on the estimated response of the MIMO channel and using spatio-temporal pulse-shaping to provide preconditioned symbols for transmission over the MIMO channel.

14. A memory communicatively coupled to a digital signal processing device (DSPD) capable of interpreting digital information to:
code data in accordance with one or more coding schemes to provide coded data;
modulate the coded data in accordance with one or more modulation schemes to provide modulation symbols;
precode the modulation symbols based on an equivalent channel response derived based on the estimated response of a MIMO channel and a response of a feed-forward filter of a decision feedback equalizer to provide precoded symbols; and
precondition the precoded symbols based on an estimated response of a multipath MIMO channel to provide preconditioned symbols for transmission over the multipath MIMO channel.

15. A transmitter unit in a multiple-input multiple-output (MIMO) communication system, comprising:
a TX (Transmit) data processor operative to code data in accordance with one or more coding schemes to provide coded data for a plurality of transmission channels in a multipath MIMO channel, modulate the coded data in accordance with one or more modulation schemes to provide modulation symbols, and precode the modulation symbols based on an equivalent channel response derived based on the estimated response of the MIMO channel and a response of a feed-forward filter of a decision feedback equalizer to provide precoded symbols; and
a TX MIMO processor operative to precondition the precoded symbols based on an estimated response of the MIMO channel to provide preconditioned symbols for transmission over the MIMO channel.

16. The transmitter unit of claim 15, wherein the TX data processor is further operative to precode the modulation symbols based on:

$$\underline{c}(n) = vmod_{2M}\left[\underline{s}(n) - \sum_{l \neq 0} \underline{F}(l)\underline{c}(n-l)\right],$$

where
- c(n) is a vector of precoded symbols for symbol period n;
- s(n) is a vector of modulation symbols for symbol period n;
- F(l) is a sequence of matrices for the equivalent channel response; and
- vmod$_{2M}$ is a vector modulo-2M arithmetic operation.

17. The transmitter unit of claim 15, wherein the TX data processor is further operative to adapt the response of the feed-forward filter based on a minimum mean square error (MMSE) criterion.

18. The transmitter unit of claim 15, wherein the TX MIMO processor is further operative to decompose a first sequence of matrices for the estimated response of the MIMO channel to obtain a second sequence of matrices of eigen-vectors and a third sequence of matrices of singular values, derive a pulse-shaping matrix based on the second and third sequences of matrices, and precondition the precoded symbols based on the pulse-shaping matrix.

19. A transmitter apparatus in a multiple-input multiple-output (MIMO) communication system, comprising:
   means for coding data in accordance with one or more coding schemes to provide coded data;
   means for modulating the coded data in accordance with one or more modulation schemes to provide modulation symbols;
   means for precoding the modulation symbols based on an equivalent channel response based on the estimated response of the MIMO channel and a response of a feed-forward filter of a decision feedback equalizer to provide precoded symbols;
   means for preconditioning the precoded symbols based on an estimated response of a MIMO channel to provide preconditioned symbols;
   means for conditioning and transmitting the preconditioned symbols over the MIMO channel.

20. A digital signal processor for use in a multiple-input multiple-output (MIMO) communication system, comprising:
   means for coding data in accordance with one or more coding schemes to provide coded data;
   means for modulating the coded data in accordance with one or more modulation schemes to provide modulation symbols;
   means for precoding the modulation symbols based on an equivalent channel response derived based on the estimated response of a MIMO channel and a response of a feed-forward filter of a decision feedback equalizer to provide precoded symbols; and
   means for preconditioning the precoded symbols based on an estimated response of a MIMO channel to provide preconditioned symbols for transmission over the MIMO channel.

* * * * *